US010628108B2

(12) United States Patent
Mirarchi et al.

(10) Patent No.: US 10,628,108 B2
(45) Date of Patent: Apr. 21, 2020

(54) CONTROLLING AN ULTRA WIDE VIDEO DISPLAY IN STADIUM SETTINGS USING MOBILE POSITIONING INFORMATION

(71) Applicants: Telefonaktiebolaget LM Ericsson (publ), Stockholm (SE); Alberto Mirarchi, Montreal (CA); Edoardo Gavita, Laval (CA); Chris Phillips, Hartwell, GA (US)

(72) Inventors: Alberto Mirarchi, Montreal (CA); Edoardo Gavita, Laval (CA); Chris Phillips, Hartwell, GA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 110 days.

(21) Appl. No.: 15/570,180

(22) PCT Filed: May 8, 2015

(86) PCT No.: PCT/US2015/029877
§ 371 (c)(1),
(2) Date: Oct. 27, 2017

(87) PCT Pub. No.: WO2016/182541
PCT Pub. Date: Nov. 17, 2016

(65) Prior Publication Data
US 2018/0136893 A1    May 17, 2018

(51) Int. Cl.
*G06F 3/14*         (2006.01)
*G09G 5/12*         (2006.01)

(52) U.S. Cl.
CPC .............. *G06F 3/1446* (2013.01); *G09G 5/12* (2013.01); *G09G 2300/026* (2013.01);
(Continued)

(58) Field of Classification Search
CPC .. G06F 3/1446; G09G 2300/026; G09G 5/12; G09G 2370/16; G09G 2370/022; G09G 2356/00
(Continued)

(56) References Cited

U.S. PATENT DOCUMENTS 8,842,113 B1 *   9/2014   Holt .................. G09G 5/12
                                                   345/419
9,727,298 B2 *   8/2017   Naruse ............. G06F 3/1423
(Continued)

FOREIGN PATENT DOCUMENTS

WO    2014096861 A2    6/2014

OTHER PUBLICATIONS

International Search Report and Written Opinion for International Patent Application No. PCT/US2015/029877, dated Jan. 15, 2016, 16 pages.

*Primary Examiner* — Chad M Dicke
(74) *Attorney, Agent, or Firm* — Patent Portfolio Builders, PLLC

(57) ABSTRACT

Systems and methods related to a mobile device video wall are disclosed. In some embodiments, a mobile device operates to obtain one or more media files that contain partial-frame video content for a grid location in a video grid for a mobile device video wall. The mobile device further operates to provide playout of partial-frame video content for the grid location such that the playout of the partial-frame video content for the grid location by the mobile device is synchronized to playout of partial-frame video content for other grid locations in the video grid by other mobile devices in the mobile device video wall.

22 Claims, 20 Drawing Sheets

(52) U.S. Cl.
CPC ... *G09G 2356/00* (2013.01); *G09G 2370/022* (2013.01); *G09G 2370/16* (2013.01)

(58) Field of Classification Search
USPC .......................................................... 345/1.3
See application file for complete search history.

(56) References Cited

U.S. PATENT DOCUMENTS

| | | | |
|---|---|---|---|
| 10,049,191 B2* | 8/2018 | Fan | H04L 63/205 |
| 10,061,552 B2* | 8/2018 | DeLuca | G09G 5/003 |
| 10,235,974 B2* | 3/2019 | Furukawa | G06F 3/0483 |
| 2003/0017823 A1 | 1/2003 | Mager et al. | |
| 2006/0218575 A1* | 9/2006 | Blair | H04L 63/10 |
| | | | 725/28 |
| 2013/0054820 A1* | 2/2013 | Reisman | G06F 16/954 |
| | | | 709/227 |
| 2013/0109364 A1 | 5/2013 | Mercuri et al. | |
| 2013/0187832 A1* | 7/2013 | Song | G09G 5/12 |
| | | | 345/1.3 |
| 2013/0335313 A1 | 12/2013 | Davis et al. | |
| 2014/0089990 A1* | 3/2014 | van Deventer | H04N 21/218 |
| | | | 725/61 |
| 2014/0372620 A1* | 12/2014 | Vedula | H04L 67/16 |
| | | | 709/228 |
| 2015/0029877 A1 | 1/2015 | Chen et al. | |
| 2015/0067521 A1* | 3/2015 | Heo | G06F 3/1446 |
| | | | 715/733 |
| 2015/0268846 A1* | 9/2015 | Gao | G06F 3/04842 |
| | | | 715/716 |
| 2015/0340009 A1* | 11/2015 | Loeffler | G06F 3/1438 |
| | | | 345/1.3 |
| 2017/0192733 A1* | 7/2017 | Huang | G06F 3/1446 |
| 2018/0232010 A1* | 8/2018 | Kummer | H04M 1/0235 |
| 2019/0141085 A1* | 5/2019 | Tsaplin | H04L 65/602 |

* cited by examiner

CONTROLLING AN ULTRA WIDE VIDEO DISPLAY IN STADIUM SETTINGS USING MOBILE POSITIONING INFORMATION

This application is a 35 U.S.C. § 371 national phase filing of International Application No. PCT/US2015/029877, filed May 8, 2015, the disclosure of which is incorporated herein by reference in its entirety.

TECHNICAL FIELD

The present disclosure relates to ultra wide video display and, in particular, ultra wide video display utilizing mobile devices.

BACKGROUND

Video displaying devices have rapidly changed over the last several years from traditional cathode ray tube display devices to 4K display devices and High Definition (HD) projectors. The size of display devices has been dramatically optimized not only in physical dimensions but also in weight. Further, smart features of modern display devices and the resulting flexibility have enabled many new possibilities that were not available when using conventional display devices.

Ultra wide video is a technology that utilizes multiple display devices (e.g., computer monitors, video projectors, or televisions) tiled together contiguously or overlapped in order to form one large video display (referred to herein as a video wall). Ultra wide video has been used at race tracks, control rooms, sporting events, concerts, and public venues to render video content in a large format.

What is desired is the use of smart devices (e.g., smart phones), flexible screens, and mobility to create a whole new way of displaying ultra wide video content.

U.S. Patent Application Publication No. 2013/0335313 A1 entitled PROCESS OF CREATING A DISPLAY, SYSTEM FOR CREATING A DISPLAY, AND MOBILE UNTETHERED DISPLAY DEVICE (hereinafter "the '313 application") teaches a system in which an image is displayed across multiple spectator display devices, which are mobile untethered devices, within a spectator region of a stadium or venue. In essence, the spectator display devices are used in lieu of the well-known technique where display cards are distributed to spectators in a stadium and the spectators hold up their display cards to form a mosaic (e.g., Go Team!). The '313 application teaches the creation of a continuous image in a spectator region by displaying appropriate image data on the spectator display devices of the spectators in the spectator region.

While the '313 application teaches the use of untethered devices (i.e., mobile devices) to create the illusion of a single large display that is well-suited for the display of an image, the systems and methods disclosed in the '313 application are not well-suited for the display of video content (e.g., ultra wide video).

SUMMARY

Systems and methods related to a mobile device video wall are disclosed. In some embodiments, a mobile device operates to obtain one or more media files that contain partial-frame video content for a grid location in a video grid for a mobile device video wall. The video grid divides each frame of the full-frame video content into multiple frame areas, each corresponding to a different grid location in the video grid such that the partial-frame video content for the grid location consists of video content from the corresponding frame area of the frame areas of the full-frame video content. Each grid location of the video grid corresponds to a different set of one or more physical locations of mobile devices within the mobile device video wall. The grid location for which the one or more media files are obtained is one of the grid locations that corresponds to a physical location of the mobile device. The mobile device further operates to provide playout of the partial-frame video content for the grid location such that the playout of the partial-frame video content for the grid location by the mobile device is synchronized to playout of partial-frame video content for other grid locations in the video grid by other mobile devices in the mobile device video wall.

In some embodiments, the mobile device further operates to receive a notification that indicates a time at which playout of the partial-frame video content for the grid location is to begin and provide playout of the partial-frame video content beginning at the time indicated by the notification. In some embodiments, the notification is a multicast notification.

In some embodiments, the mobile device further operates to receive a multicast notification address:port, join a multicast at the multicast notification address:port, receive a multicast notification via the multicast on the multicast notification address:port that indicates a time at which playout of the partial-frame video content for the grid location is to begin, and provide playout of the partial-frame video content beginning at the time indicated by the multicast notification.

In some embodiments, the mobile device further operates to send location information to a remote system that is indicative of the physical location of the mobile device and receive one or more Uniform Resource Locators (URLs) for the one or more media files from the remote system in response to sending the location information. Further, the mobile device operates to obtain the one or more media files that contain partial-frame video content for the grid location using the one or more URLs.

In some embodiments, the mobile device further operates to, after playout of the full-frame video content by the mobile device video wall has begun, receive a notification that indicates a master player playout timing for the full-frame video content and provide playout of the partial-frame video content according to the master player playout timing such that playout of the partial-frame video content begins at an appropriate playout location within the partial-frame video content to synchronize playout at the mobile device with playout at other media devices in the mobile device video wall. Further, in some embodiments, the notification is a multicast notification.

In some embodiments, the mobile device further operates to receive a multicast notification address:port, join a multicast at the multicast notification address:port, receive a multicast notification via the multicast on the multicast notification address:port that indicates a master player playout timing for the partial-frame video content for the grid location, and provide playout of the partial-frame video content according to the master player playout timing such that playout of the partial-frame video content begins at an appropriate playout location within the partial-frame video content to synchronize playout at the mobile device with playout at other media devices in the mobile device video wall.

Embodiments of a server system operative to provide playout of full-frame video content by a mobile device video wall are also disclosed. The server system operates to, for each mobile device of multiple mobile devices comprised in the mobile device video wall, deliver one or more media files that contain partial-frame video content for a grid location in a video grid for the mobile device video wall. The video grid divides each frame of the full-frame video content into multiple frame areas each corresponding to a different grid location in the video grid such that the partial-frame video content for the grid location consists of video content from the corresponding frame area of the full-frame video content. Each grid location of the video grid corresponds to a different set of one or more physical locations of mobile devices within the mobile device video wall. The grid location for which the one or more media files are delivered to the mobile device is one of the grid locations that corresponds to a physical location of the mobile device. The server system further operates to provide, to the mobile devices comprised in the mobile device video wall, a notification that enables the mobile devices comprised in the mobile device video wall to provide synchronized playout of the partial-frame video content for the corresponding grid locations of the video grid.

In some embodiments, the notification indicates a time at which playout of the full-frame video content by the mobile device video wall is to begin. In some embodiments, the notification is a multicast notification.

In some embodiments, the server system further operates to provide a multicast notification address:port to the mobile devices to thereby enable the mobile devices to join a multicast at the multicast notification address:port, and provide the notification by transmitting the notification via the multicast on the multicast notification address:port.

In some embodiments, the server system further operates to, for each mobile device comprised in the mobile device video wall, receive location information that is indicative of the physical location of the mobile device, determine the grid location of the mobile device within the video grid based on the location information, and deliver one or more URLs for the one or more media files for the grid location to the mobile device.

In some embodiments, the server system further operates to, after playout of the full-frame video content by the mobile device video wall has begun, multicast notifications to the mobile devices that indicate a master player playout timing for the full-frame video content.

In some embodiments, the server system further operates to, after playout of the full-frame video content by the mobile device video wall has begun, receive location information that is indicative of the physical location of a new mobile device, determine that the new mobile device is in the video grid based on the location information, and determine that playout for the full-frame video content by the mobile device video wall has already began. Upon determining that playout for the full-frame video content by the mobile device video wall has already began, the server system further operates to determine whether to accept the new mobile device into the mobile device video wall, determine a grid location of the new mobile device within the video grid based on the location information, and, upon determining to accept the new mobile device into the mobile device video wall, deliver, to the new mobile device, one or more URLs for the one or more media files for the grid location of the new mobile device.

In some embodiments, the server system further operates to deliver a multicast notification address:port to the new mobile device to thereby enable the new mobile device to join a multicast at the multicast notification address:port and provide the notification by multicasting a notification on the multicast notification address:port that indicates a master player playout timing for the full-frame video content.

In some embodiments, the server system further operates to determine whether it is safe to begin playout of the full-frame video content on the mobile device video wall and determine whether playout of the full-frame video content on the mobile device video wall has been triggered. The server system further operates to provide the notification by providing, to the mobile devices comprised in the mobile device video wall, a notification that indicates a time at which playout of the full-frame video content by the mobile device video wall is to begin upon determining that it is safe to begin playout of the full-frame video content on the mobile device video wall and determining that playout of the full-frame video content on the mobile device video wall has been triggered.

In some embodiments, the server system operates to determine whether it is safe to begin playout of the full-frame video content on the video wall based on whether media files for at least a predefined threshold number of the grid locations in the video grid have been successfully delivered to corresponding mobile devices in the mobile device video wall.

In some embodiments, the server system further operates to generate the video grid and encode the full-frame video content according to the video grid to provide partial-frame video content for the plurality of grid locations in the video grid. Further, in some embodiments, the video grid is dynamically generated.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
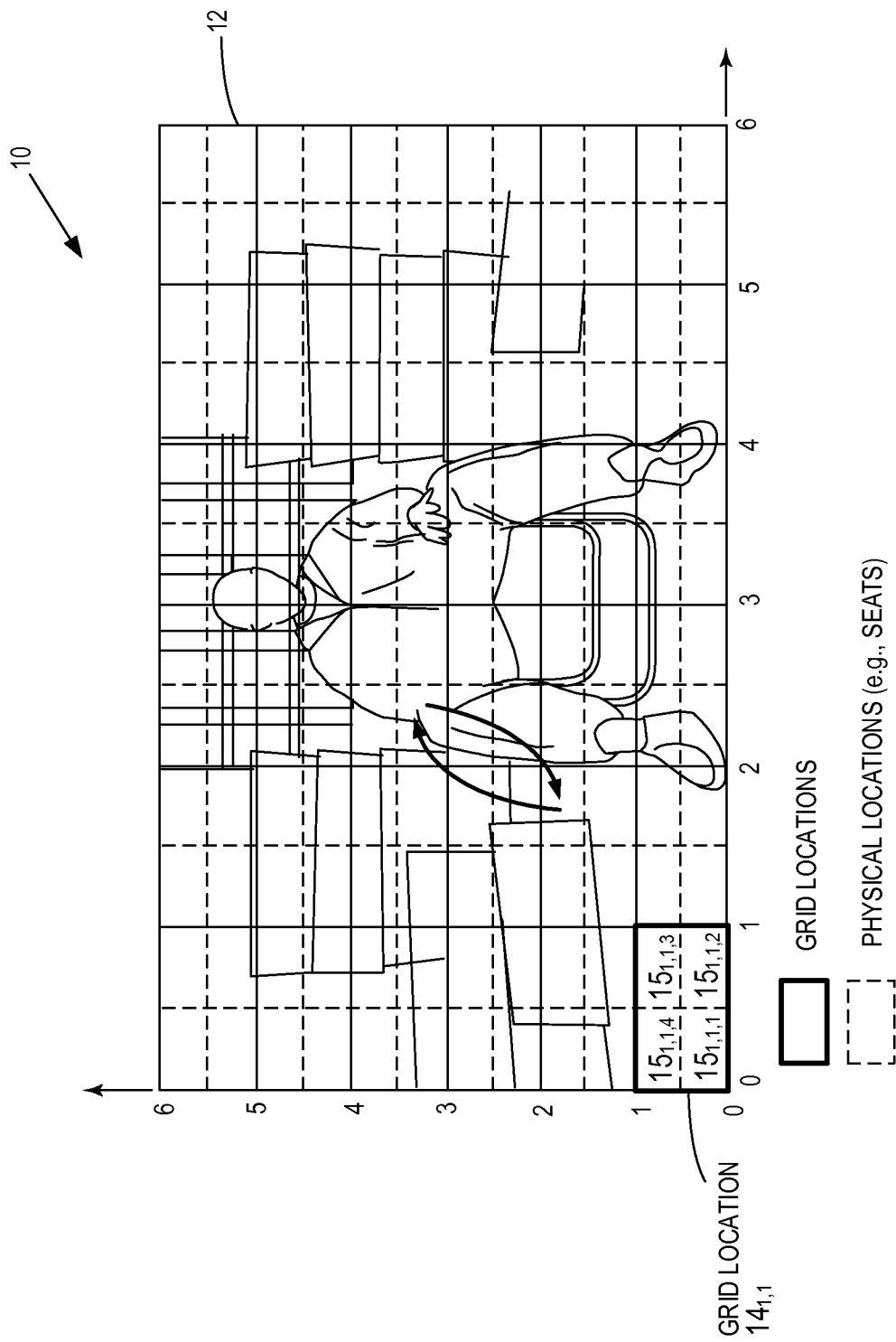
FIG. 1 illustrates one example of a mobile device video wall according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to a mobile device video wall. However, before describing embodiments of the present disclosure, definitions for a number of terms used herein are beneficial.

Mobile Device Video Wall: As used herein, a mobile device video wall is an ultra wide video display created from a number of mobile devices (i.e., mobile display devices such as, e.g., smart phones, tablets, or even wearables that have display capabilities). In some embodiments, the mobile device video wall is created in a stadium or similar venue.

Media/Video File: A media/video file is a data structure that includes video/media content and, in some implementations, metadata (e.g., encoding parameters) about the video/media content.

Video Content: As used herein, video content is purely video content (i.e., video but no audio) or audio/video content (i.e., both audio and video content).

Full-Frame Video Content: As used herein, full-frame video content is the original video content to be displayed on a mobile device video wall (i.e., video content prior to generating partial-frame video content according to a video grid). The full-frame video content consists of a sequence of frames. This original video content may be un-encoded video content or it may be encoded video content in any standard or non-standard format, such as using a source broadcast stream as the original video content. The original video content may be encoded or transcoded to a common proper format enabling playout across a mix of various devices (e.g., Android devices, iOS devices, Microsoft devices, etc.).

Video Grid: As used herein, a video grid is a logical construct that includes a number of grid locations. Each grid location corresponds to one or more physical locations in a mobile device video wall in the physical domain and an area within a frame (i.e., a frame area) of full-frame video content in the video domain.

Frame Area: An area within a frame of full-frame video content defined by a particular grid location of a video grid.

Partial-Frame Video Content: As used herein, partial-frame video content is video content for a single grid location in a video grid. Specifically, partial-frame video content consists of a series of frames, where each frame of the partial-frame video content is a portion of a corresponding frame of full-frame video content within a frame area defined by a corresponding grid location. So, for grid location X,Y in a video grid, the partial-frame video content for the grid location X,Y can be defined as a set of frames $\{FA_{i,X,Y}\}_{i=0 \ldots N}$, where $FA_{i,X,Y}$ is the Frame Area (FA) defined by grid location X,Y for the i-th frame of the full-frame video content and N+1 is the number of frames in the full-frame video content.

Systems and methods disclosed herein relate to a mobile device video wall that can, e.g., be used to provide playout of video content in, e.g., a stadium setting. Notably, while a stadium setting is one example of an environment in which the mobile device video wall disclosed herein may be particularly beneficial, the mobile device video wall disclosed herein may be utilized in any desired setting.

FIG. 1 illustrates one example of a mobile device video wall 10 according to some embodiments of the present disclosure. As illustrated, full-frame video content is presented, or played out, on the mobile device video wall 10. A video grid 12 defines a number of grid locations $14_{X,Y}$, where X,Y is the index of the grid locations $14_{X,Y}$ (generally referred to herein as grid locations 14). In the illustrated example, X=1, 2, . . . , 6 and Y=1, 2, . . . , 6 such that there are a total of 36 grid locations 14. The grid locations 14 define corresponding frame areas of the full-frame video content. Each grid location 14 in the video grid 12 corresponds to, in this example, a particular group of physical locations $15_{X,Y,Z}$ in the mobile device video wall 10. For instance, if the mobile device video wall 10 is implemented in a stadium, each grid location 14 may correspond to different groups of adjacent seats in the stadium (i.e., the group of physical locations $15_{X,Y,Z}$ for grid location $14_{X,Y}$ is a group of adjacent seats in the stadium, in this example). Notably, while in this example each grid location 14 maps to a group of physical locations, each grid location 14 may alternatively map to a single physical location (e.g., a single seat in a stadium).

As discussed below in detail, during operation, mobile devices are assigned to the different grid locations 14 based on the physical locations of the mobile devices. The mobile devices then operate to display partial-frame video content for the corresponding grid locations 14. So, for instance, the mobile devices at a group of physical locations corresponding to the grid location $14_{1,1}$ operate to display partial-frame video content for the grid location $14_{1,1}$. Thus, in effect, the mobile devices operate to display a "pixel" of the full-frame video content in the mobile device video wall 10. Playout of the partial-frame video content by the mobile devices for the grid locations 14 in the video grid 12 is synchronized to thereby provide playout of the full-frame video content on the mobile device video wall 10.

As also illustrated in FIG. 1, the video content displayed by the mobile devices changes in response to a change in the physical locations of the mobile devices. In particular, in this example, the mobile devices originally located at the physical locations corresponding to the grid locations $14_{2,2}$ and $14_{4,3}$ switch places (e.g., the users switch seats in the stadium example). In response, the partial-frame video content displayed by those mobile devices is updated accordingly such that the mobile devices provide playout of the partial-frame video content for the appropriate grid locations 14 in the mobile device video wall 10.

Figure 2:
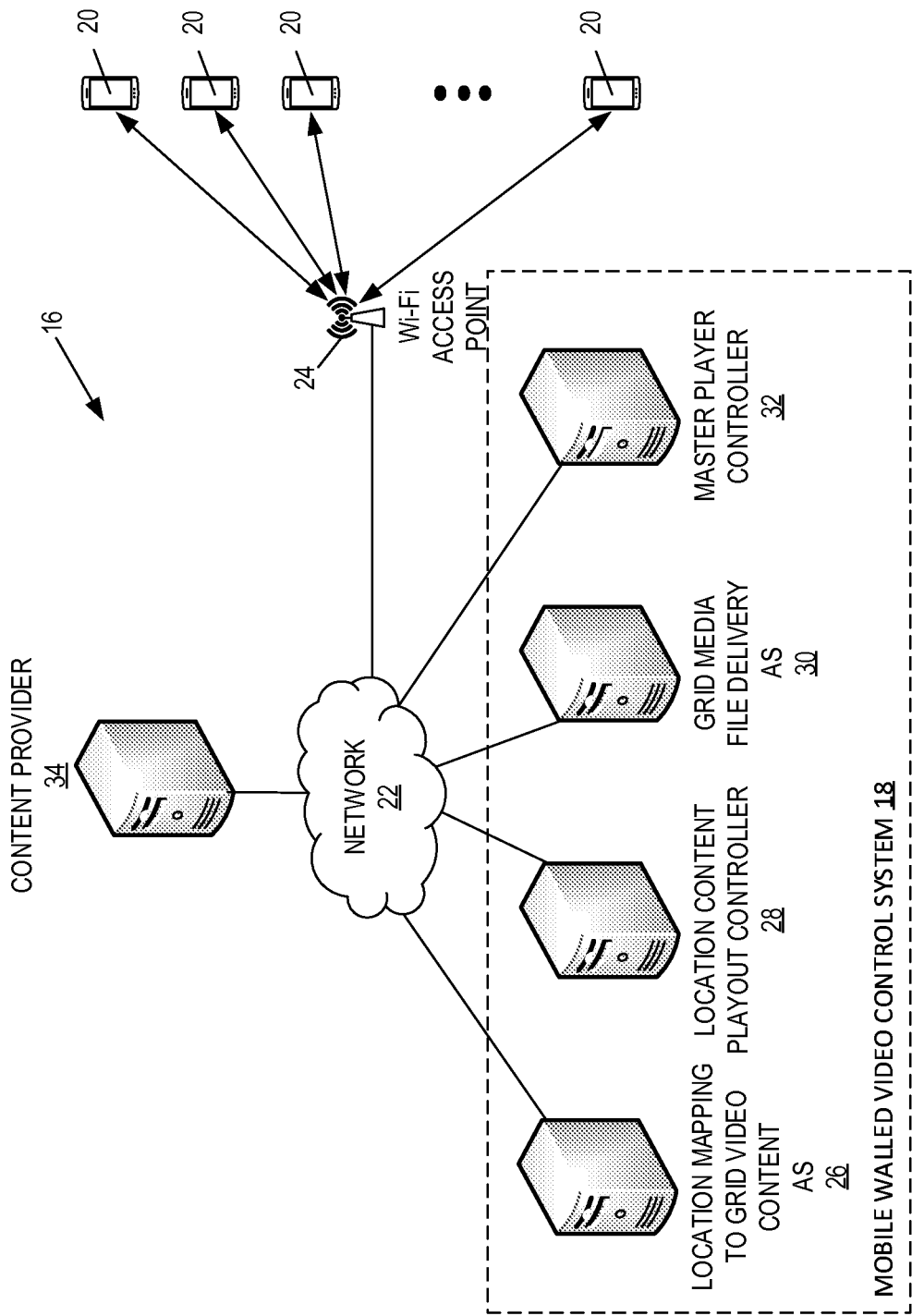
FIG. 2 illustrates a system for providing a mobile device video wall according to some embodiments of the present disclosure.

FIG. 2 illustrates a system 16 that enables the mobile device video wall 10 according to some embodiments of the present disclosure. As illustrated, the system 16 includes a mobile walled video control system 18 and a number of mobile devices 20 communicatively coupled to a network 22. In this example, the mobile devices 20 are communicatively coupled to the network 22 via a Wi-Fi network, as indicated by a Wi-Fi access point 24. However, the mobile devices 20 may alternatively be communicatively coupled to the network 22 via a cellular network or other wireless network. The mobile devices 20 are generally any type of mobile device having a display suitable for displaying partial-frame video content for the mobile device video wall 10, location determination sub-systems that enable the mobile devices 20 to determine their physical locations, network/communication interfaces enabling the mobile devices 20 to send and receive information via, in this example, the Wi-Fi access point 24, and playout subsystems (e.g., hardware and, in some cases, software) for providing playout of partial-video content on the displays of the mobile devices 20 as described herein. One example of a mobile device 20 is a smart phone; however, the present disclosure is not limited thereto.

The mobile walled video control system 18 generally operates to provide partial-frame video content to the mobile devices 20 for the mobile device video wall 10 according to their physical locations in the video grid 12. In addition, the mobile walled video control system 18 operates to synchronize playout of the partial-frame video content by the mobile devices 20 to thereby provide playout of the full-frame video content on the mobile device video wall 10.

In the illustrated example, the mobile walled video control system 18 includes a location mapping to grid video content Application Server (AS) 26, a location content playout controller 28, a grid media file delivery AS 30, and a master player controller 32, each of which is implemented in a combination of hardware and/or software. For instance, the components 26-32 of the mobile walled video control system 18 may be implemented as software executable by processors (e.g., Central Processing Units (CPUs)) of one or more server computers to provide the functionality of the mobile walled video control system 18. As discussed below in detail, the location mapping to grid video content AS 26 operates to map the physical locations of the mobile devices 20 to the grid locations 14 in the video grid 12 for the full-frame video content to be presented on the mobile device video wall 10. The location content playout controller 28 operates to control playout of the partial-frame video content by the mobile devices 20 in the mobile device video wall 10 such that playout of the partial-frame video content by the mobile devices 20 begins in a synchronized manner. The grid media file delivery AS 30 operates to generate the partial-frame video content for the different grid locations 14 in the video grid 12 from the full-frame video content and deliver the media files for the partial-frame video content to the mobile devices 20 according to their locations. In this example, the full-frame video content is obtained from a remote video content provider 34, e.g., a source of a video broadcast such as a live broadcast of a sporting event. The master player controller 32 operates to provide master player playout timing to the mobile devices 20 for the mobile device video wall 10 such that playout of the partial-frame video content by the mobile devices 20 in the mobile device video wall 10 (even those that join after playout by the other mobile devices 20 has begun) continues to be synchronized.

Figure 3:
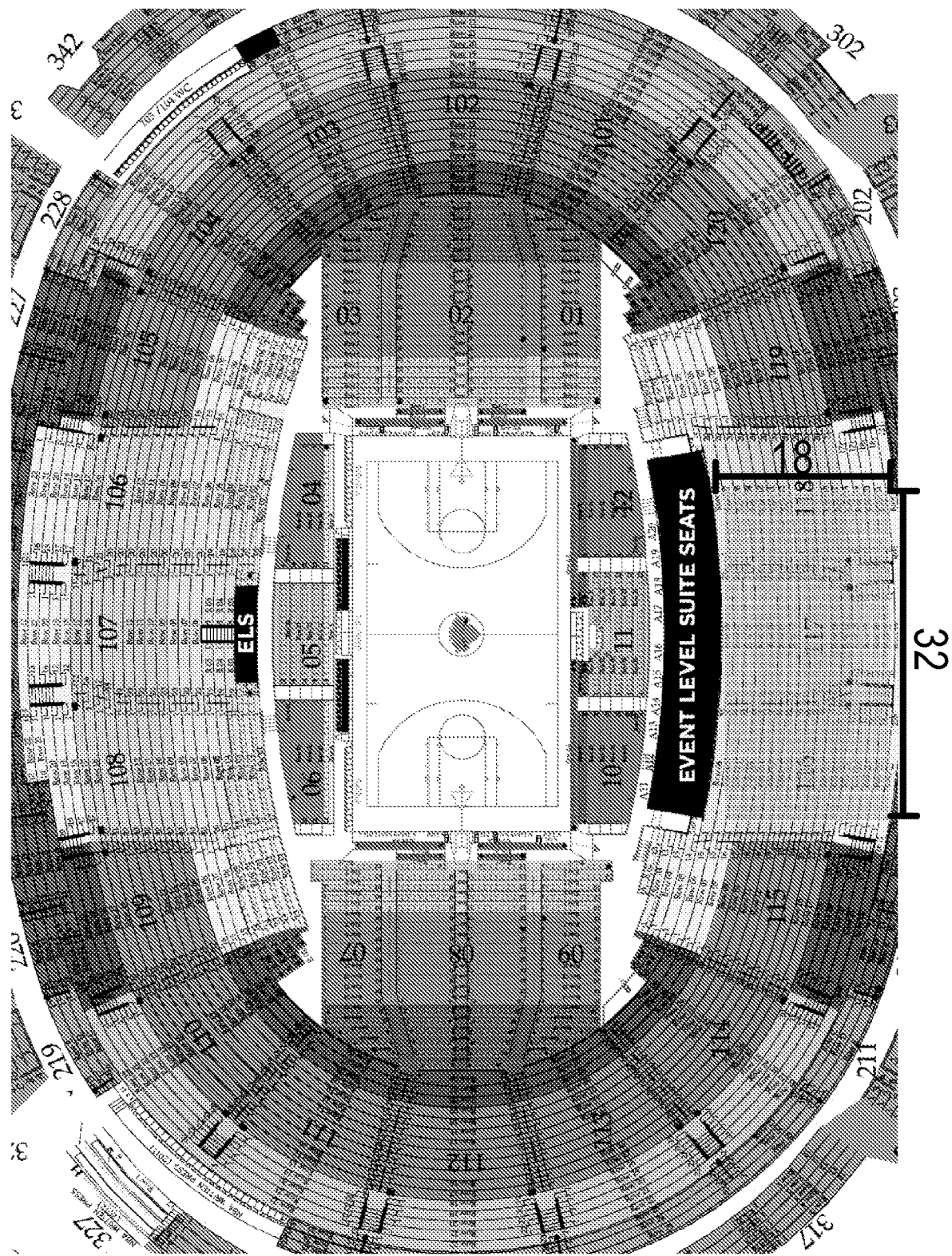
FIG. 3 illustrates one example of the selection of a portion of the seating in a stadium for use with a video grid for a mobile device video wall according to some embodiments of the present disclosure.

Before discussing further details, a discussion of one example of the mobile device video wall 10 in a stadium environment is beneficial. In this regard, FIG. 3 is a diagram of a stadium and, in particular, a seating chart for a stadium. In this example, a 32×18 video grid is defined. The 32×18 video grid is defined for a portion of the seating in the stadium such that each grid location in the video grid corresponds to, in this example, a group of seats in the stadium. For instance, each grid location may correspond to a group of four adjacent seats (i.e., two adjacent seats in two adjacent rows—e.g., seats 1 and 2 of rows 20 and 21 in section 116). Notably, in some embodiments, the video grid may be dynamically defined by, e.g., an operator associated with the stadium. For instance, during a sporting event at the stadium, an operator may define the video grid dynamically as desired.

Figure 4:
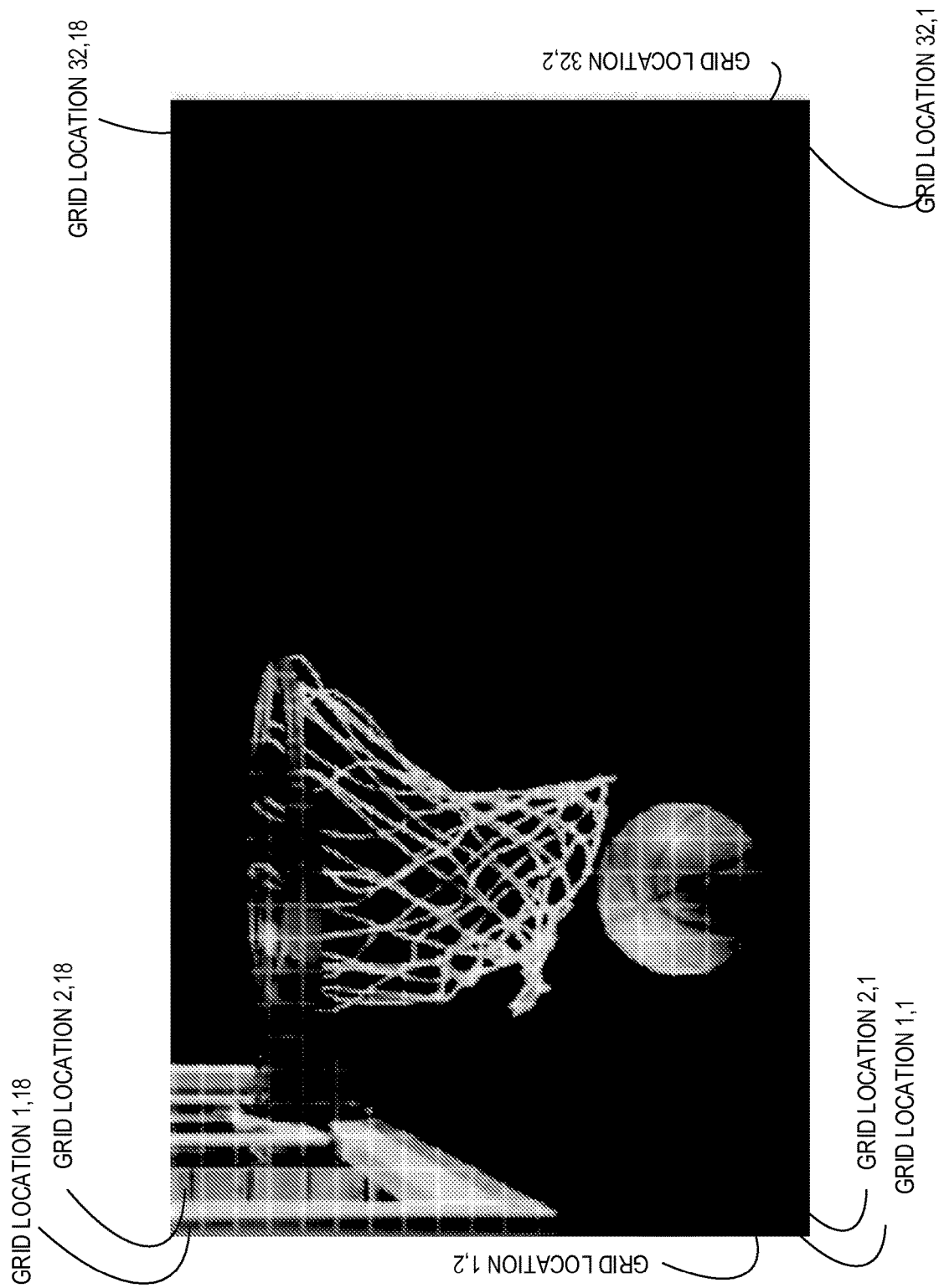
FIG. 4 illustrates one example of the video grid of FIG. 3 as used to define different frame areas of full-frame video content according to some embodiments of the present disclosure.

FIG. 4 illustrates one example of the 32×18 video grid of FIG. 3 as mapped to full-frame video content to be presented via the mobile device video wall 10. As illustrated, the 32×18 video grid is a grid of 32×18 grid locations, each defining a respective frame area of the full-frame video content.

Figure 5:
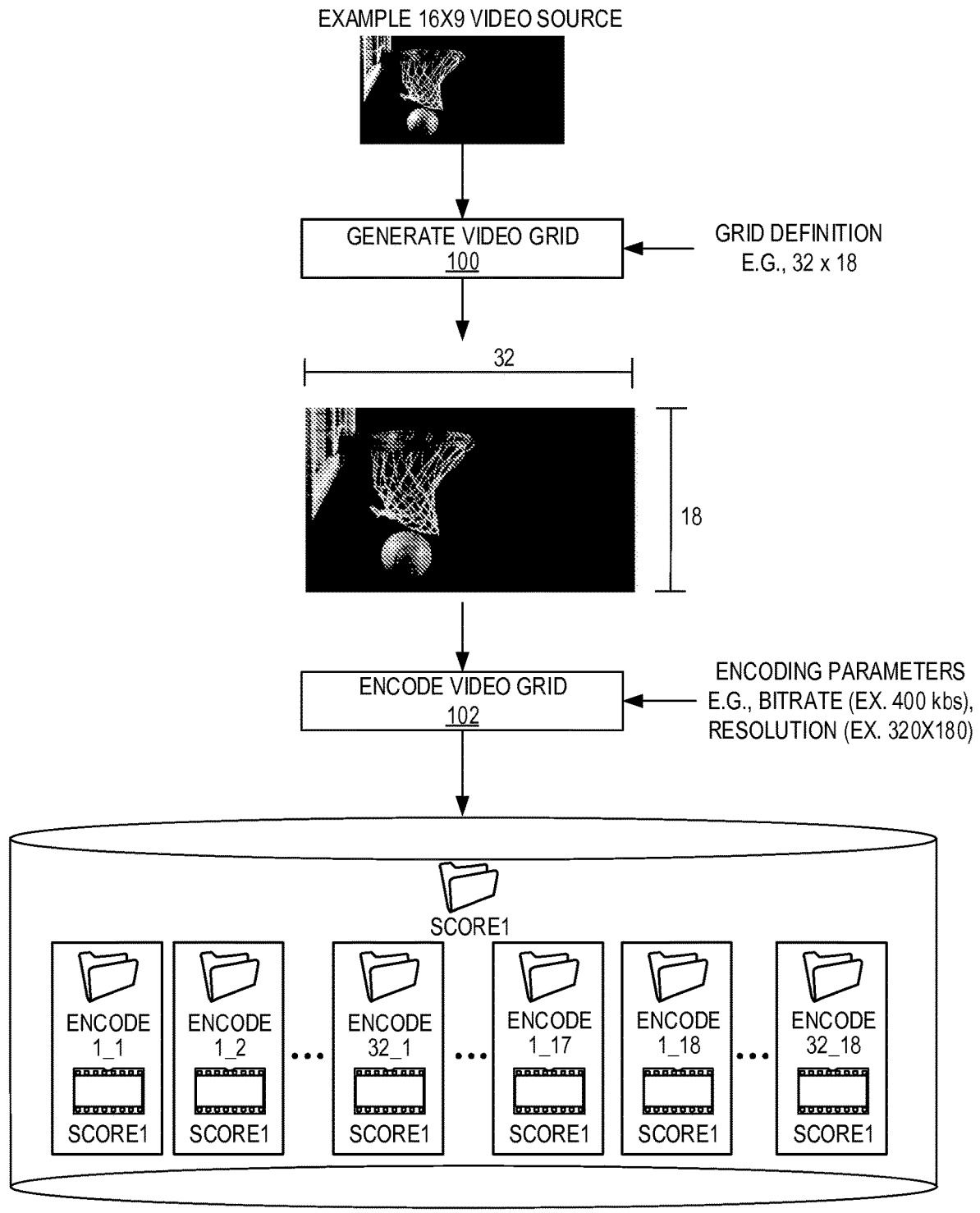
FIG. 5 illustrates a process for generating partial-frame video content from the full-frame video content according to the video grid of the example of FIG. 3 according to some embodiments of the present disclosure.

Using the example of FIGS. 3 and 4, FIG. 5 illustrates a process for generating the partial-frame video content for the grid locations in the video grid according to some embodiments of the present disclosure. Notably, in FIG. 5 and other figures of this disclosure, various processes are described with respect to "steps." Note, however, that the "steps" may be performed in any desired order and are not limited to being performed in any particular order unless otherwise stated or required. Further, some "steps" may be performed in parallel. As illustrated, the process begins with the full-frame video content (e.g., a 16×9 aspect ratio video source). The video grid is generated according to a grid definition (step 100). In particular, the grid definition defines the dimensions of the video grid (e.g., the number of rows and columns of the video grid). Using the grid definition, the video grid for the full-frame video content is generated such that each grid location in the video grid corresponds to a respective frame area of the full-frame video content. Notably, in some embodiments, the video grid may be dynamically generated, e.g., in response to selection of a different portion of the stadium seating for use for the mobile device video wall, which can be defined by an operator, e.g., of the mobile walled video control system 18.

The full-frame video content is encoded according to the video grid and one or more defined encoding parameters (step 102). As a result, media files are created for each grid location. For each grid location, the media file(s) for that grid location contain the partial-frame video content for that grid location. In this example, the full-frame video content is contained in a media file named "Score1." The encoding is performed by one or more encoders (e.g., a separate encoder for each grid location) to provide media files containing the partial-frame video content from Score1 for the respective grid locations. In this example, the partial-frame video content for the grid location 1,1 is stored in a media file named "Score1" in a folder named "Encode1_1," the partial-frame video content for the grid location 1,2 is stored in a media file named "Score1" in a folder named "Encode1_2," etc.

As discussed below, the media files containing the partial-frame video content are then provided to the mobile devices 20 according to their physical locations in the video grid. Thus, the media file(s) for the grid location 1,1 is provided to the mobile device(s) 20 physically located in, in this example, the seat(s) in the stadium that correspond to the grid location 1,1, etc. Playout of the partial-frame video content by the mobile devices 20 in the mobile device video wall 10 is synchronized to thereby provide playout of the full-frame video content on the mobile device video wall 10.

Figure 6A:
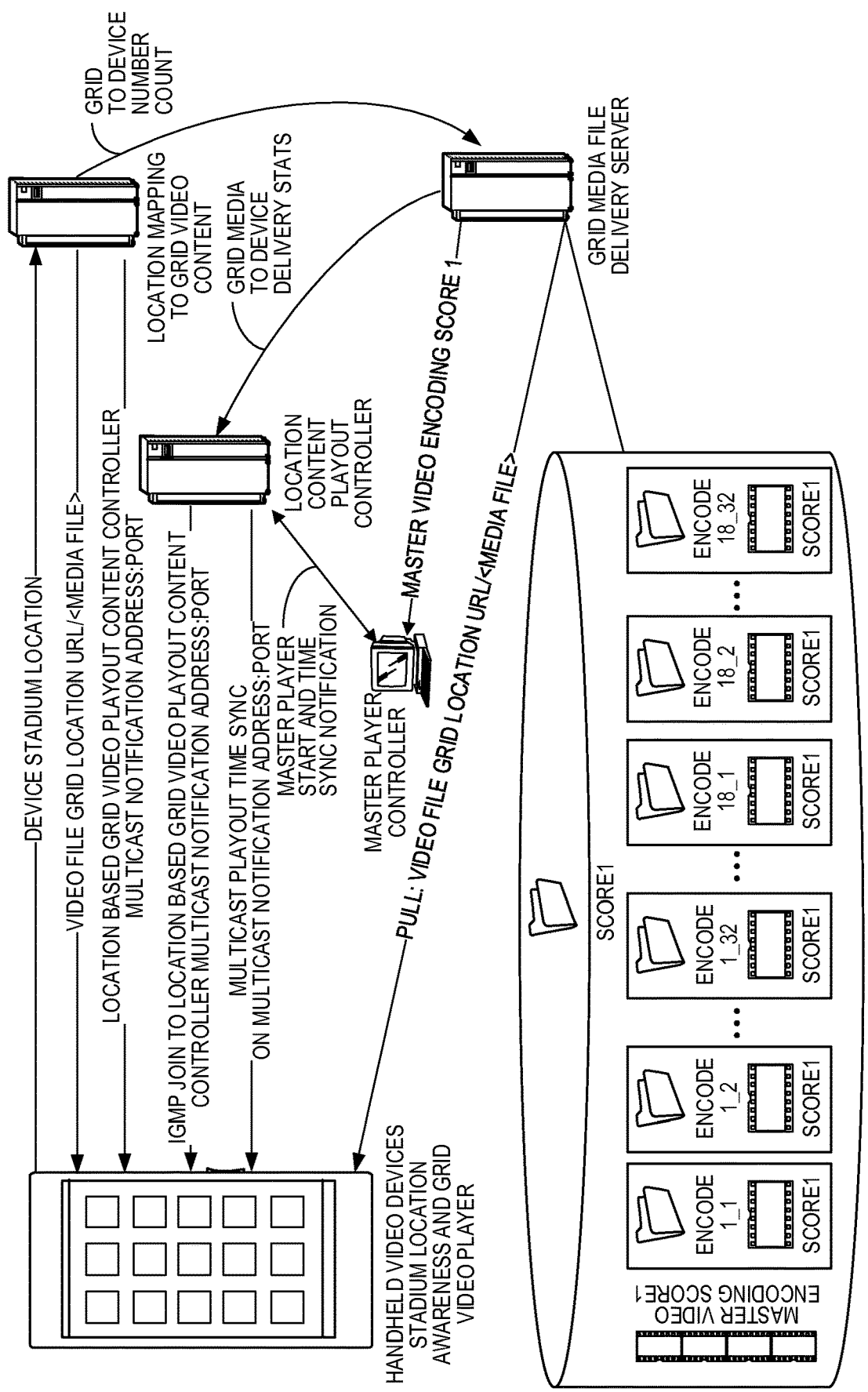
FIGS. 6A and 6B illustrate the operation of the system of FIG. 2 to provide a mobile device video wall according to the examples of FIGS. 3-5 according to some embodiments of the present disclosure.

The operation of the system 16 is illustrated in FIG. 6A with respect to one of the mobile devices 20 and the example of FIGS. 3-5. As illustrated, the mobile device 20 sends information indicative of the physical location of the mobile device 20 within, in this example, the stadium to the location mapping to grid video content AS 26. The location mapping to grid video content AS 26 maps the physical location of the mobile device 20 to one of the grid locations of the video grid and returns a video file grid location Uniform Resource Locator (URL) for the media file containing the partial-frame video content for that grid location to the mobile device 20. In addition, the location mapping to grid video content AS 26 returns a location based grid video playout content controller multicast notification address:port to the mobile device 20. As discussed below, this multicast notification address:port is utilized for synchronization of playout of the partial-frame video content for the grid location by the mobile device 20 with playout of partial-frame video content by the other mobile devices 20 in the mobile device video wall 10. The location mapping to grid video content AS 26 also provides a grid-to-device number count provided to the grid media file delivery AS 30. Notably, the grid-to-device number count is, in some embodiments, used as a way to determine if a "safe" number of devices have downloaded the partial-frame video content for the corresponding grid locations to meet predetermined requirements for a satisfactory display coverage for the mobile device video wall 10. If not enough mobile devices have downloaded the media file(s), then the video content would not be marked as "safe to play" thus not allowing playout to begin.

The mobile device 20 performs an Internet Group Management Protocol (IGMP) join to the location based grid video playout controller multicast notification address:port and pulls, or downloads, the media file containing the partial-frame video content for the grid location from the grid media file delivery AS 30. The grid media file delivery AS 30 sends media to device delivery statistics to the location content playout controller 28. These stats may include, for example, the number of mobile devices 20 and/or grid locations for which partial-frame video content has been successfully delivered.

The grid media file delivery AS 30 also provides master, full-frame video content to be presented via the mobile device video wall 10 to the master player controller 32. Once the location content playout controller 28 determines that playout is ready to begin (e.g., once the partial-frame video content for a sufficient number (e.g., greater than a predefined threshold) of the grid locations has been successfully delivered to the appropriate mobile devices 20), the location content playout controller 28 multicasts a playout time (i.e., a playout start time) on the multicast notification address:port and triggers the start of playout of the full-frame video content on the master player controller 32 at the playout time. The mobile device 20 receives the playout time on the multicast notification address:port and begins playout of the partial-frame video content for its grid location at the playout time. The playout time may be an absolute time or a relative time (e.g., 30 seconds after receipt of the multicast notification).

In some embodiments, the master player controller 32 sends updates to the playout timing on the multicast notification address:port (e.g., directly or indirectly via the location content playout controller 28) to, e.g., maintain synchronized playout of the partial-frame video content by the mobile devices 20 and playout of the full-frame video content by the master player controller 32. This may be particularly useful where, for example, a mobile device 20 joins the mobile device video wall 10 after playout has already began.

Figure 6B:
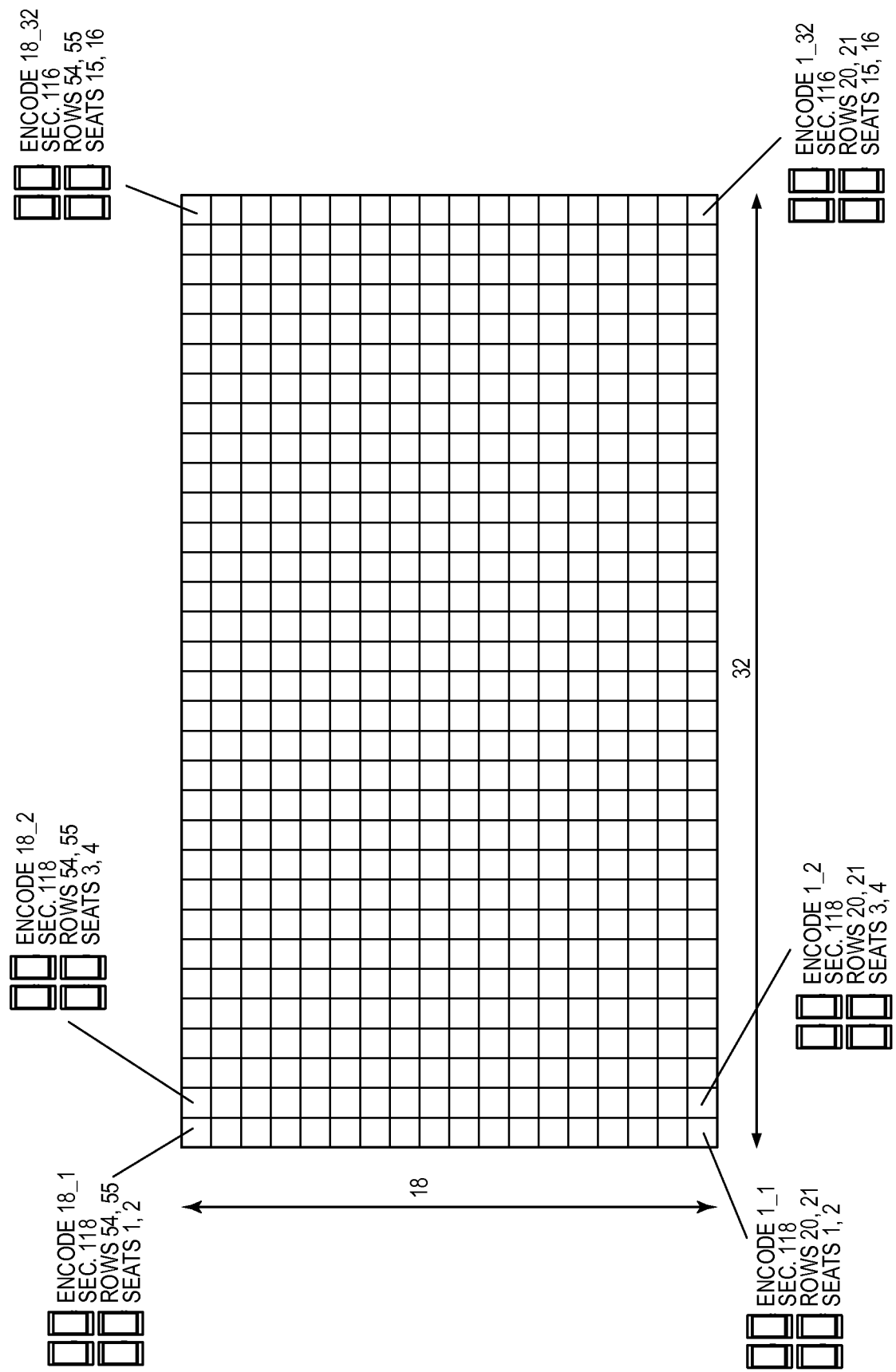

FIG. 6B illustrates the mapping of the media files containing the partial-frame video content for the different grid locations to the appropriate mobile devices 20 in the video grid for the mobile device video wall 10. As illustrated, each grid location includes a group of seats in the stadium. In this particular example, the media file (referred to as "Encode1_1") containing the partial-frame video content for the grid location 1,1 is delivered to the mobile devices 20 located in seats 1 and 2 in rows 20 and 21 of section 118, the media file (referred to as "Encode1_2") containing the partial-frame video content for the grid location 1,2 is delivered to the mobile devices 20 located in seats 3 and 4 in rows 20 and 21 of section 118, etc.

Figure 7A:
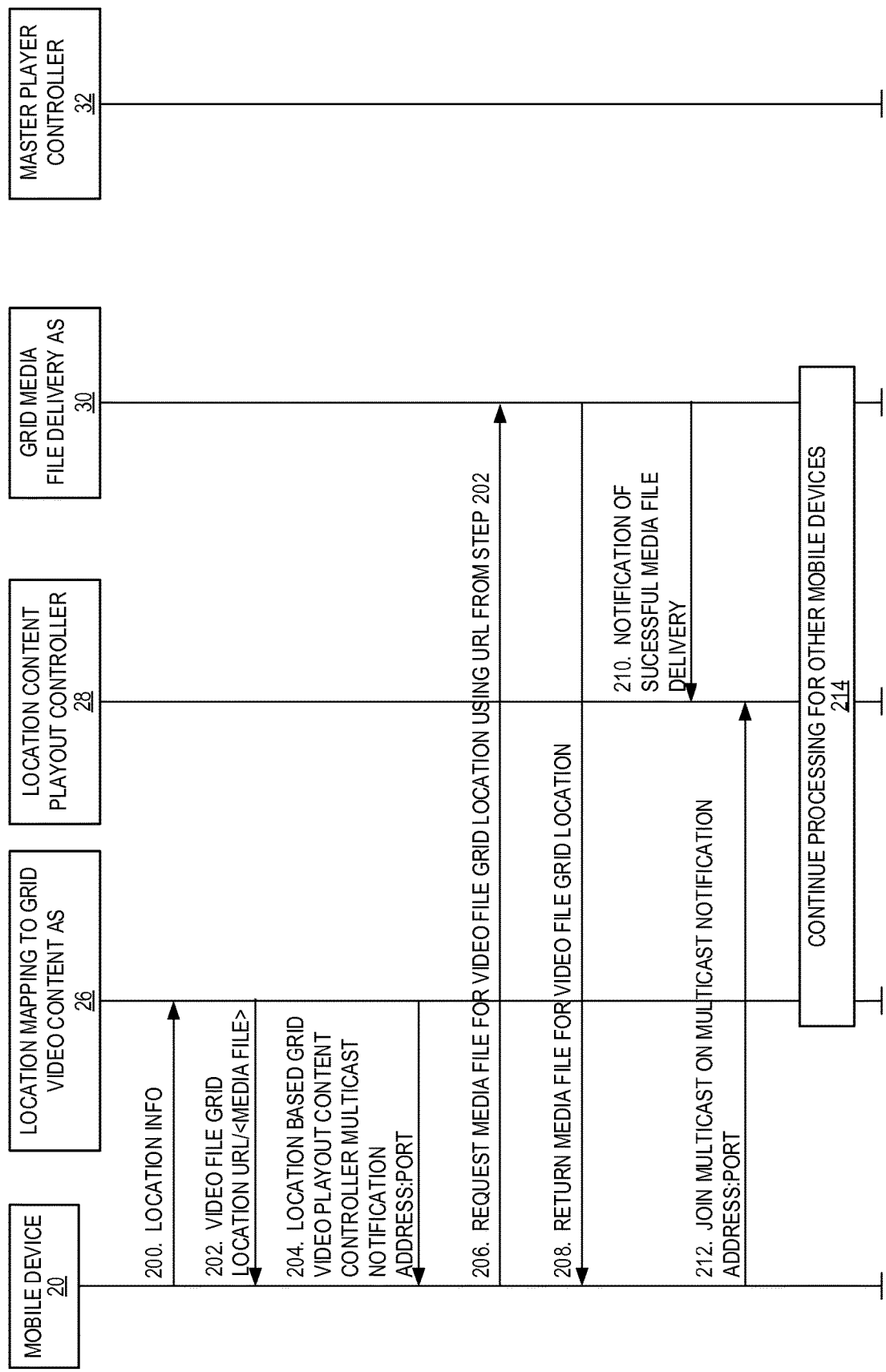
FIGS. 7A and 7B illustrate the operation of the system of FIG. 2 according to some embodiments of the present disclosure.
Figure 7B:
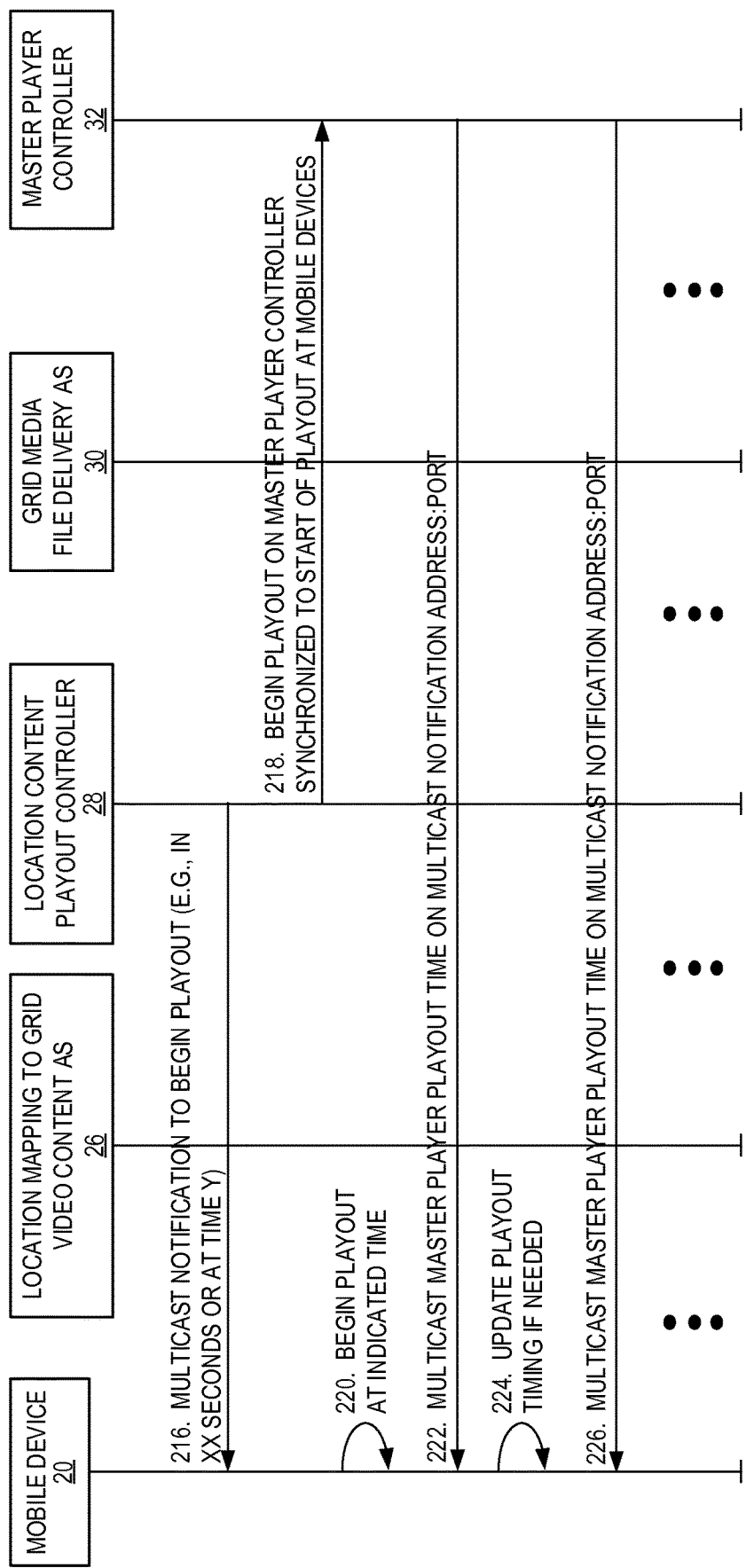

FIGS. 7A and 7B illustrate the operation of the system 16 according to some embodiments of the present disclosure. This process is similar to that of FIGS. 6A and 6B. As illustrated, the mobile device 20 first sends location information to the location mapping to grid video content AS 26 that is indicative of the physical location of the mobile device 20 (step 200). The physical location, or position, of the mobile device 20 may be determined using any suitable technology. For instance, in some embodiments, the mobile device 20 determines its physical location using Bluetooth Low Energy (LE) proximity. Bluetooth LE beacons are part of the new generation Bluetooth 4.0 standard. Devices using Bluetooth LE wireless technology consume a fraction of the power of classic Bluetooth enabled devices. Bluetooth LE provides an excellent basis for real-time positioning solutions using the signals from beacons installed throughout the environment in which the mobile device video wall 10 is implemented (e.g., beacons installed on the seats in a stadium). Using Bluetooth LE beacons and a corresponding Bluetooth LE interface of the mobile device 20, the mobile device 20 can detect a Bluetooth LE beacon. Some identifier of the Bluetooth LE beacon or some information communicated by the Bluetooth LE beacon can then be provided to the location mapping to grid video content AS 26 as the location information of the wireless device 20.

As another example, the mobile device 20 may determine its location using Wi-Fi. Wi-Fi supports a number of different location approaches today, but the two most common are localization based on signal strength (using multiple received signal measurements to calculate the source's location) and Radio Frequency (RF) fingerprinting (collecting on-site RF data to map signal measurements to locations). For example, the location of the mobile device 20 may be determined through triangulation using multiple Wi-Fi access points. But to really make sense of the location evolution within Wi-Fi, one has to put it in context of the historical goals and techniques. Asset tagging is the historical solution using Real-Time Location Service (RTLS) tags.

Other positioning systems may be used. For example, Global Positioning System (GPS) or cellular-network based positioning systems may be used to determine the location of the mobile device 20.

In other embodiments, Quick Response (QR) codes of seating locations can be QR encoded and printed on ticket stubs. A user of the mobile device 20 may then scan the QR code on the user's ticket stub to determine the physical location of the mobile device 20.

Once the physical location of the mobile device 20 has been obtained, the mobile device 20 sends corresponding location information (e.g., a Bluetooth Identity (ID) associated with a detected Bluetooth LE beacon, a Wi-Fi tag ID, a seat number, or the like) to the location mapping to grid video content AS 26. The location mapping to grid video content AS uses the location information to determine if the mobile device 20 is in a defined video grid and if so, the grid location in which the mobile device 20 is located. Assuming that the mobile device 20 is in the video grid, the location mapping to grid video content AS 26 sends, to the mobile device 20, a video file grid location URL for the media file(s) containing the partial-frame video content for the grid location in which the mobile device 20 is located (step 202). Notably, while a URL is used in this example, any mechanism may be used that enables the mobile device 20 to obtain the partial-frame video content for the grid location. In addition, the location mapping to grid video content AS 26 sends, to the mobile device 20, a location based grid video playout content controller multicast notification address:port (step 204). In other words, the location mapping to grid video content AS 26 returns an address:port for multicast notifications.

The mobile device 20 sends a request for the media file(s) containing the partial-frame video content for the grid location to the grid media file delivery AS 30 (step 206). In response, the grid media file delivery AS 30 returns the media file(s) containing the partial-frame video content for the grid location to the mobile device 20 (step 208) and notifies the location content playout controller 28 of successful media file delivery for the grid location (step 210). In addition, the mobile device 20 joins the multicast on the multicast notification address:port (e.g., using an IGMP multicast join) (step 212). The location mapping to grid video content AS 26, the location content playout controller 28, and the grid media file delivery AS 30 then continue in this manner to receive location information from other mobile devices 20 and to provide the appropriate media files to those mobile devices 20 (step 214).

At some point, the location content playout controller 28 determines that it is safe for playout of the full-frame video content on the mobile device video wall 10 to begin. This determination may be made when the location content playout controller 28 has received notifications from the grid media file delivery AS 30 indicating that media files for a defined number of the grid locations have been successfully delivered to the appropriate mobile devices 20. The defined number of grid locations may be static or may be dynamic (e.g., configurable by the operator). The determination regarding when it is safe to begin playout may additionally or alternatively be based on one or more predefined criteria such as, for example, a predefined time at which playout is desired to begin.

Upon determining that playout is safe to begin and once the operator triggers the start of playout (or the start of playout is otherwise triggered), the location content playout controller 28 transmits a multicast notification to begin playout on the multicast notification address:port (step 216). This multicast notification may define a relative time for playout to begin (e.g., in XX seconds after some reference time, e.g., the time of receipt of the multicast notification) or an absolute time for playout to being (e.g., begin playout at time Y). In addition, the location content playout controller 28 instructs the master player controller 32 to begin playout synchronized to the start of playout at the mobile devices 20 as indicated by the multicast notification (step 218).

The mobile device 20 begins playout of the partial-frame video content for the corresponding grid location at the time indicated by the multicast notification (step 220). In some embodiments, in order to ensure that synchronized playout is maintained across the mobile devices 20 in the mobile device video wall 10, the master player controller 32 multicasts a master player playout time on the multicast notification address:port (step 222). The master player playout time may be multicast by the master player controller 32 directly or provided to the location content playout controller 28 for multicast by the location content playout controller 28. The master player playout time may indicate, for example, an absolute or relative time at which a particular point in the full-frame video content, and thus the partial-frame video content, is to playout. For example, if the full-frame video content is a five minute video, the master player playout time may indicate that the point in the full-frame video content at one minute from the start of the full-frame video content is to play at time Z. In response receipt of the master playout time, the mobile device 20 updates its playout timing according to the master player playout time if needed (step 224). Subsequently, the mobile device 20 receives another master player playout time on the multicast notification address:port from the master player controller 32 (step 226) and updates its playout timing if needed. Notably, in some embodiments, the master player playout timing is multicast periodically (e.g., every M seconds). The process then continues in this manner.

Figure 8:
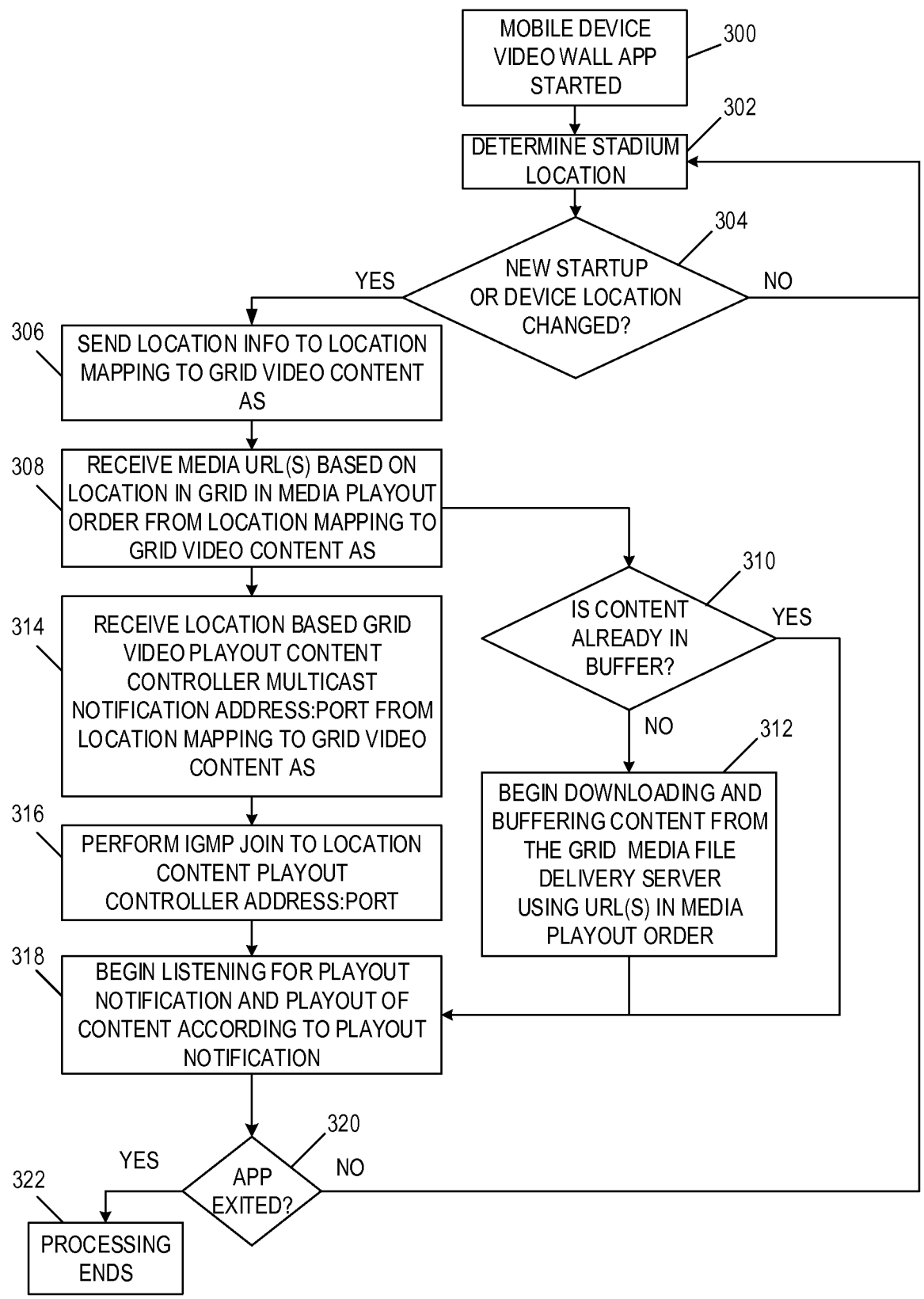
FIG. 8 is a flow chart that illustrates the operation of one of the mobile devices of FIG. 2 according to some embodiments of the present disclosure.

FIG. 8 is a flow chart that illustrates the operation of the mobile device 20 in more detail according to some embodiments of the present disclosure. As illustrated, the mobile device 20 first starts an application that provides the mobile device video wall functionality of the mobile device 20 (step 300). The mobile device 20, and in particular the mobile device video wall application, determines the physical location of the mobile device 20 (step 302). In this example, the physical location is the location, or position, of the mobile device 20 within a stadium (e.g., a seat number). The mobile device 20 determines whether current processing is for a new startup of the mobile device video wall application or, if not, if the physical location of the mobile device 20 has changed (step 304). If "no," the process returns to step 302. If "yes," the mobile device 20, and in particular the mobile device video wall application, sends location information that is indicative of the physical location of the mobile device 20 to the location mapping to grid video content AS 26 (step 306).

This process assumes that the wireless device 20 is in the video grid. As such, in response to sending the location information to the location mapping to grid video content AS 26, the mobile device 20 receives a URL(s) for the media file(s) containing the partial-frame video content for the grid location in which the mobile device 20 is located (step 308). If there are multiple media files, the URLs for those media files are provided in playout order. Upon receiving the URL(s) of the media file(s), the mobile device 20 determines whether the media file(s), or partial-frame video content, is already buffered or otherwise stored at the mobile device 20 (step 310). If so, the process proceeds to step 318. If not, the mobile device 20 begins downloading and buffering/storing the media file(s) containing the partial-frame video content from the grid media file delivery AS 30 using the URL(s) (step 312). If there are multiple media files, the media files are downloaded in the playout order of the respective partial-frame video content contained in the media files.

In addition, the mobile device 20 receives the multicast notification address:port from the location mapping to grid video content AS 26 (step 314) and performs an IGMP join to that multicast notification address:port (step 316). The mobile device 20 then begins listening for a playout notification on the multicast notification address:port and, in response to receiving a playout notification, begins playout of the partial-frame video content contained in the media file(s) according to the playout notification (step 318). The mobile device 20 determines whether the mobile device video wall application is exited (step 320). If not, the process returns to step 302 and is repeated. If the application is exited, processing ends (step 322).

Figure 9:
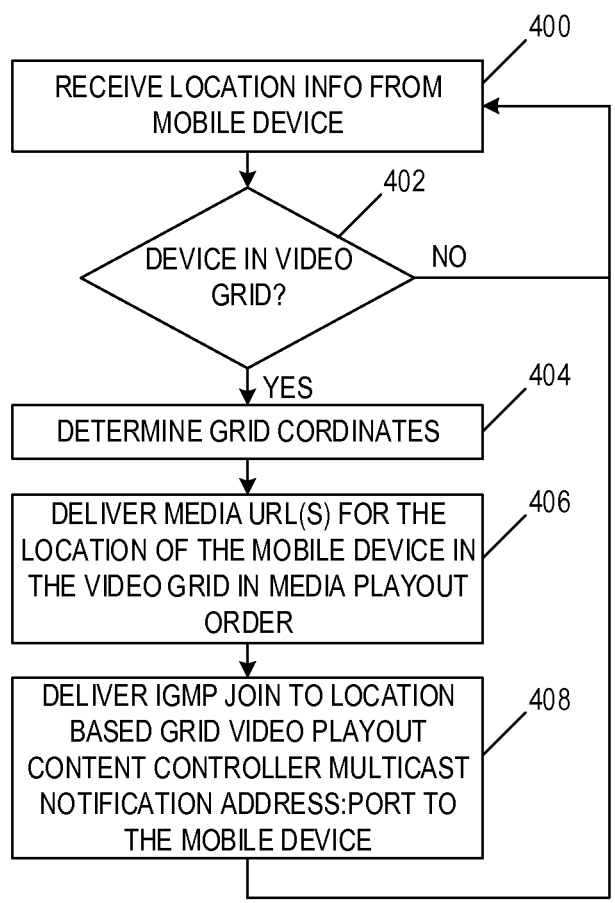
FIG. 9 is a flow chart that illustrates the operation of location mapping to grid video content Application Server (AS) of FIG. 2 according to some embodiments of the present disclosure.

FIG. 9 is a flow chart that illustrates the operation of the location mapping to grid video content AS 26 in more detail according to some embodiments of the present disclosure. As illustrated, the location mapping to grid video content AS 26 receives location information from the mobile device 20 (step 400). Based on the location information, the location mapping to grid video content AS 26 determines whether the mobile device 20 is located in a video grid (step 402). If not, the process returns to step 400 and is repeated upon receiving location information from a mobile device 20. If the mobile device 20 is in a video grid, the location mapping to grid video content AS 26 uses the location information of the mobile device 20 to determine the grid location, or grid coordinates, corresponding to the physical location of the mobile device 20 (step 404). The location mapping to grid video content AS 26 then delivers a URL(s) for the media file(s) containing the partial-frame video content for the grid location and the multicast notification address:port to the mobile device 20, as discussed above (steps 406 and 408).

Figure 10:
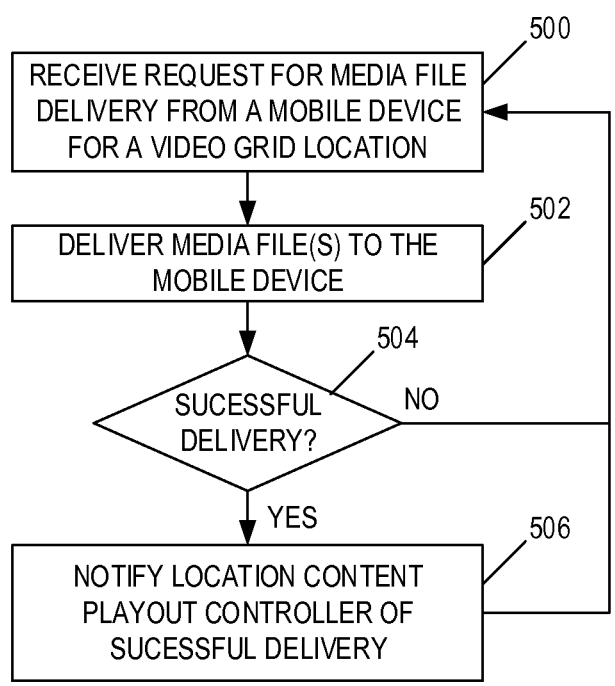
FIG. 10 is a flow chart that illustrates the operation of the grid media file delivery AS of FIG. 2 according to some embodiments of the present disclosure.

FIG. 10 is a flow chart that illustrates the operation of the grid media file delivery AS 30 in more detail according to some embodiments of the present disclosure. As illustrated, the grid media file delivery AS 30 receives a request for media file delivery from the mobile device 20 for a corresponding grid location (step 500). In response, the grid media file delivery AS 30 delivers the media file(s) containing the partial-frame video content for the grid location to the mobile device 20 (step 502). If delivery is successful (step 504; YES), the grid media file delivery AS 30 notifies the location content playout controller 28 of the successful delivery of the media file(s) for the grid location (step 506).

If delivery is not successful (step 504; NO), the process returns to step 500 where the grid media file delivery AS 30 processes the next request.

Figure 11:
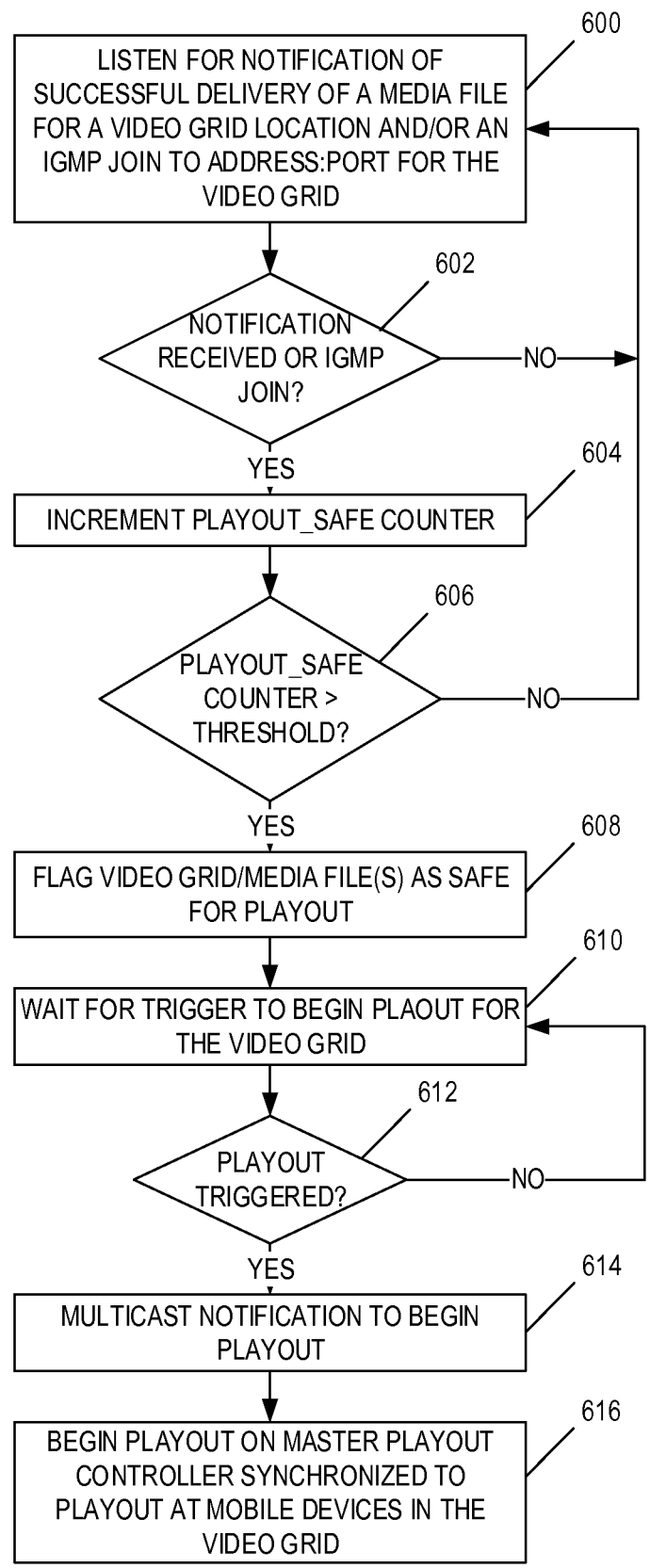
FIG. 11 is a flow chart that illustrates the operation of the location content playout controller of FIG. 2 according to some embodiments of the present disclosure.

FIG. 11 is a flow chart that illustrates the operation of the location content playout controller 28 in more detail according to some embodiments of the present disclosure. As illustrated, the location content playout controller 28 listens, or monitors, for a notification from the grid media file delivery AS 30 of successful delivery of a media file for a grid location in a video grid and/or an IGMP join at the address:port for the video grid (step 600). The location content playout controller 28 determines whether: (a) a notification for a successful media file delivery for a grid location in the video grid has been received or (b) an IGMP join has been performed by a mobile device 20 for which a notification of a successful media file delivery has not been previously received (e.g., in the case where the mobile device 20 did not need to download the partial-frame video content for the corresponding grid location but then performed an IGMP join to the address:port for the video grid) (step 602). If not, the process returns to step 600. Otherwise, the location content playout controller 28 determines whether playout is safe.

In this example, the location content playout controller 28 determines whether playout is safe by first incrementing a playout_safe counter upon determining that a notification of a successful media file delivery or IGMP joint has occurred (step 604) and then determining whether the playout_safe counter is greater than a predefined threshold (step 606). Again, it should be noted that the playout_safe counter should be incremented only once for a particular mobile device 20 (i.e., only once for a mobile device 20 for which there is a successful media file delivery and an IGMP join). If the playout_safe counter is not greater than the predefined threshold (i.e., if playout is determined to be not safe), the process returns to step 600.

Once playout is safe (step 606; YES), the location content playout controller 28 flags the video grid and/or the media files for the grid locations of the video grid as being safe for playout (step 608) and waits for a predefined trigger to being playout for the video grid (i.e., to begin playout for the mobile device video wall 10) (step 610). If playout is not triggered (step 612; NO), the location content playout controller 28 continues to wait for the trigger. Once playout is triggered (step 612; YES), the location content playout controller 28 transmits a multicast notification on the multicast notification address:port to begin playout (step 614) and instructs the master player controller 32 to begin playout synchronized to playout at the mobile devices 20 (step 616), as discussed above.

Figure 12:
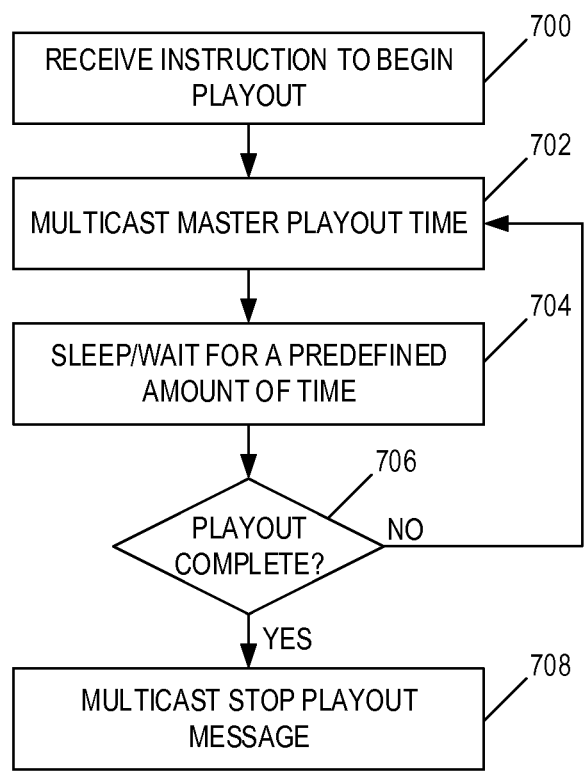
FIG. 12 is a flow chart that illustrates the operation of the master playout controller of FIG. 2 according to some embodiments of the present disclosure.

FIG. 12 is a flow chart that illustrates the operation of the master playout controller 32 in more detail according to some embodiments of the present disclosure. As illustrated, the master player controller 32 receives an instruction to begin playout (step 700). The master player controller 32 begins playout at the time indicted by the instruction and multicasts a master playout time on the multicast notification address:port (step 702). The master player controller 32 then sleeps/waits for a predefined amount of time (step 704). After sleeping/waiting the predefined amount of time, the master player controller 32 determines whether playout is complete (step 706). If not, the process returns to step 702 where a new master playout time is multicast on the multicast notification address:port. Once playout is complete, the master player controller 32 multicasts a stop playout message on the multicast notification address:port (step 708).

Figure 13:
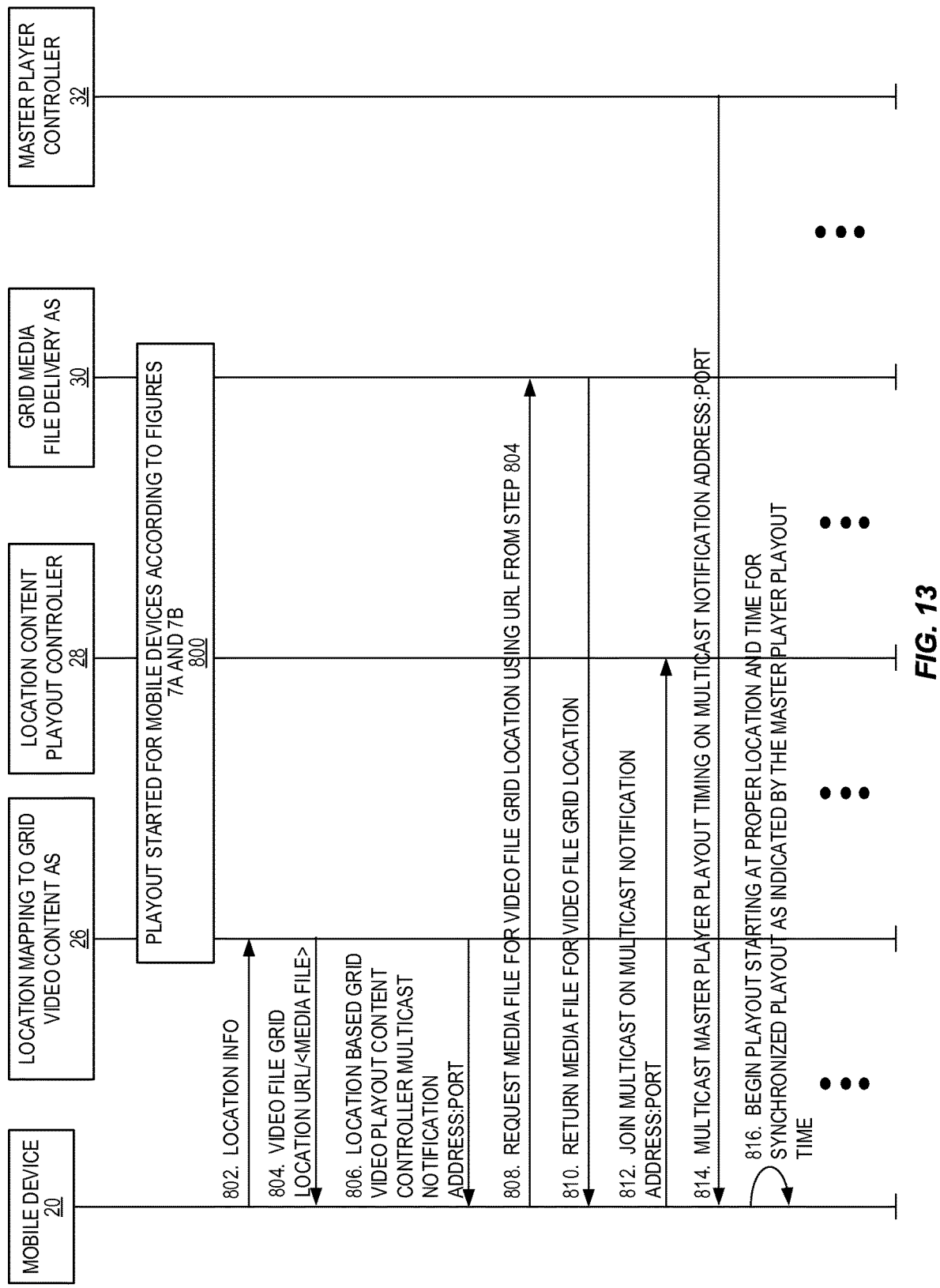
FIG. 13 illustrates the operation of the system of FIG. 2 according to some embodiments of the present disclosure in which a mobile device joins the mobile device video wall after playout has begun.

FIG. 13 illustrates the operation of the system 16 in a scenario where a mobile device 20 joins the mobile device video wall 10 after playout has already begun, according to some embodiments of the present disclosure. As illustrated, playout on the mobile device video wall 10 is started according to, e.g., the process of FIGS. 7A and 7B (step 800). Sometime after playout has started, the mobile device 20 sends location information indicating the physical location of the mobile device 20 to the location mapping to grid video content AS 26 (step 802). The location mapping to grid video content AS uses the location information to determine if the mobile device 20 is in a defined video grid and, if so, the grid location in which the mobile device 20 is located. Assuming that the mobile device 20 is in the video grid, the location mapping to grid video content AS 26 sends, to the mobile device 20, a video file grid location URL for the media file(s) containing the partial-frame video content for the grid location in which the mobile device 20 is located (step 804). Notably, while a URL is used in this example, any mechanism may be used that enables the mobile device 20 to obtain the partial-frame video content for the grid location. If there are multiple media files for the grid location, the location mapping to grid video content AS 26 may send the URLs for all of the media files for the grid location or send the URL(s) for those media file(s) containing the partial-frame video content that has not yet been played out on the mobile device video wall 10. In addition, the location mapping to grid video content AS 26 sends, to the mobile device 20, a location based grid video playout content controller multicast notification address:port (step 806). In other words, the location mapping to grid video content AS 26 returns an address:port for multicast notifications.

Using the URL(s), the mobile device 20 sends a request for the media file(s) containing the partial-frame video content for the grid location to the grid media file delivery AS 30 (step 808). In response, the grid media file delivery AS 30 returns the media file(s) containing the partial-frame video content for the grid location to the mobile device 20 (step 810). In addition, the mobile device 20 joins the multicast on the multicast notification address:port (e.g., using an IGMP multicast join) (step 812).

The mobile device 20 receives a master player playout time on the multicast notification address:port from the master player control 32 (step 814). Upon receiving the master player playout time, the mobile device 20 begins playout of the partial-frame video content contained in the media file(s) for the grid location according to the master player playout time (step 816). In doing so, rather than starting playout at the beginning of the partial-frame video content, the mobile device 20 begins playout of the partial-frame video content at the appropriate point to provide synchronized playout with the master player controller 32 and, thus, with the other mobile devices 20 in the mobile device video wall 10. The process then continues in this manner.

Figure 14:
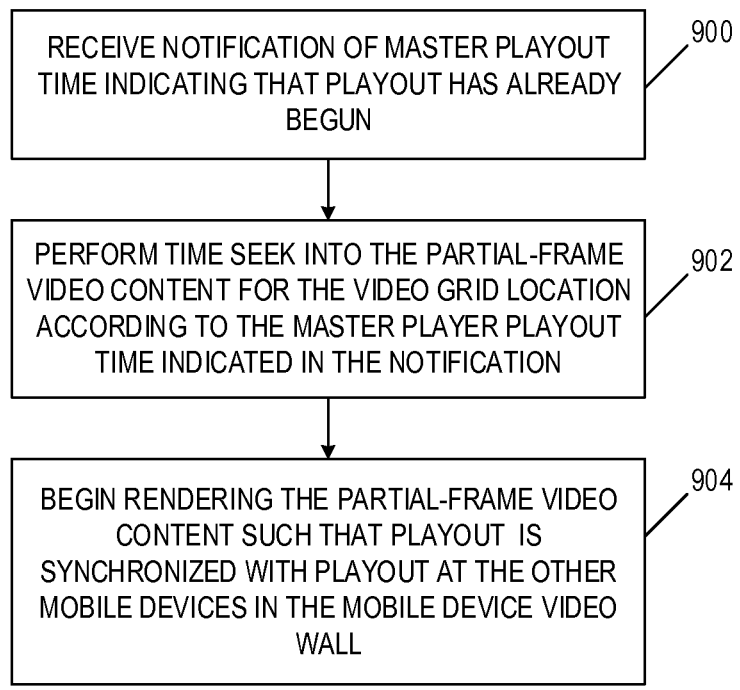
FIG. 14 is a flow chart that illustrates the operation of the mobile device of FIG. 13 according to some embodiments of the present disclosure.

FIG. 14 is a flow chart that illustrates the operation of the mobile device 20 of FIG. 13 according to some embodiments of the present disclosure. After sending its location information to the location mapping to grid video content AS 26, obtaining the media file(s) for the appropriate grid location, and joining the multicast as described above, e.g., with respect to FIG. 8, the mobile device 20 receives a notification of the master playout time indicating that playout on the mobile device video wall 10 has already begun (step 900). The mobile device 20 performs a time seek into the partial-frame video content for the grid location according to the master player playout time indicated in the notification (step 902) and begins rendering the partial-frame video content for the grid location such that playout at the mobile device 20 is synchronized with playout at the other mobile devices 20 in the mobile device video wall 10 (step 904).

Figure 15A:
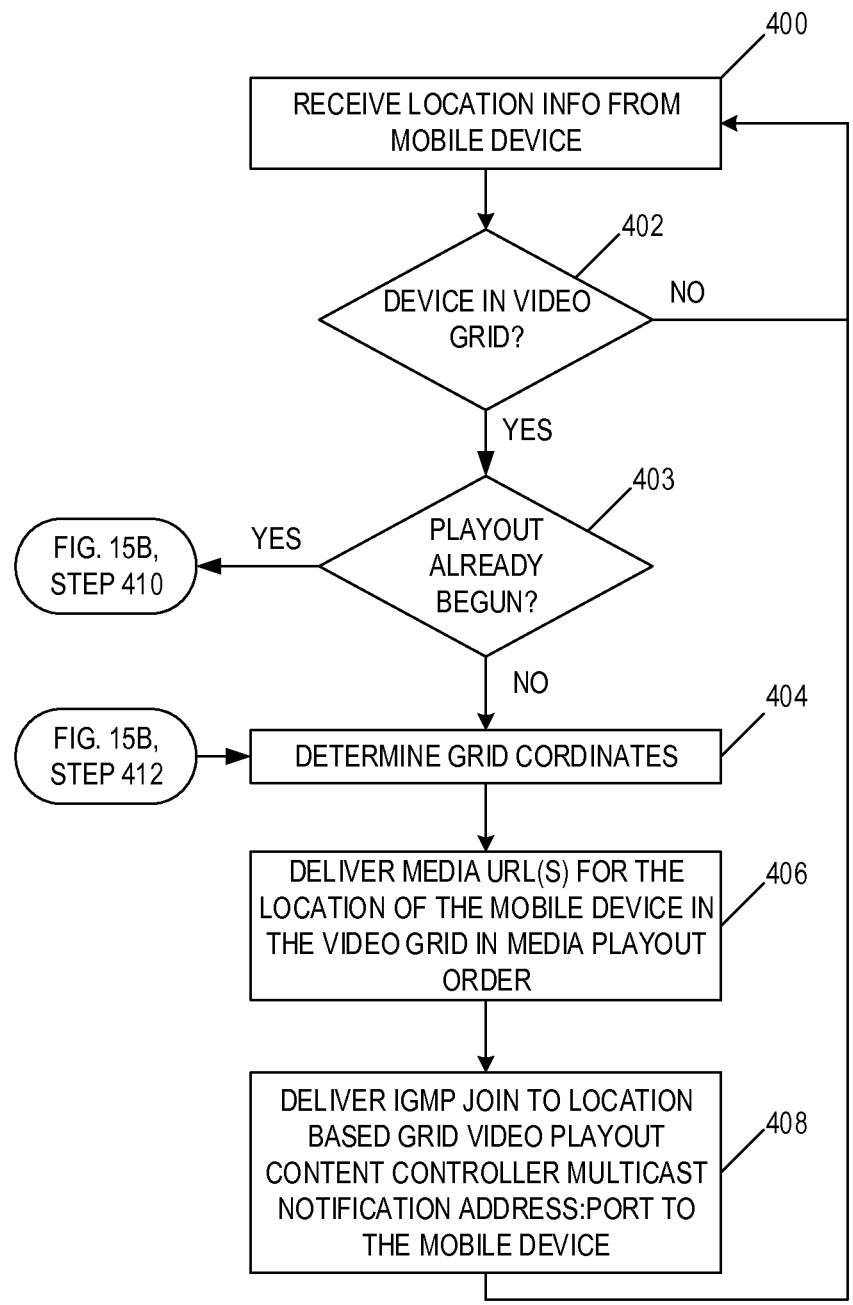
FIGS. 15A and 15B illustrate a flow chart for the operation of the location mapping to grid video content AS of FIG. 13 according to some embodiments of the present disclosure.
Figure 15B:
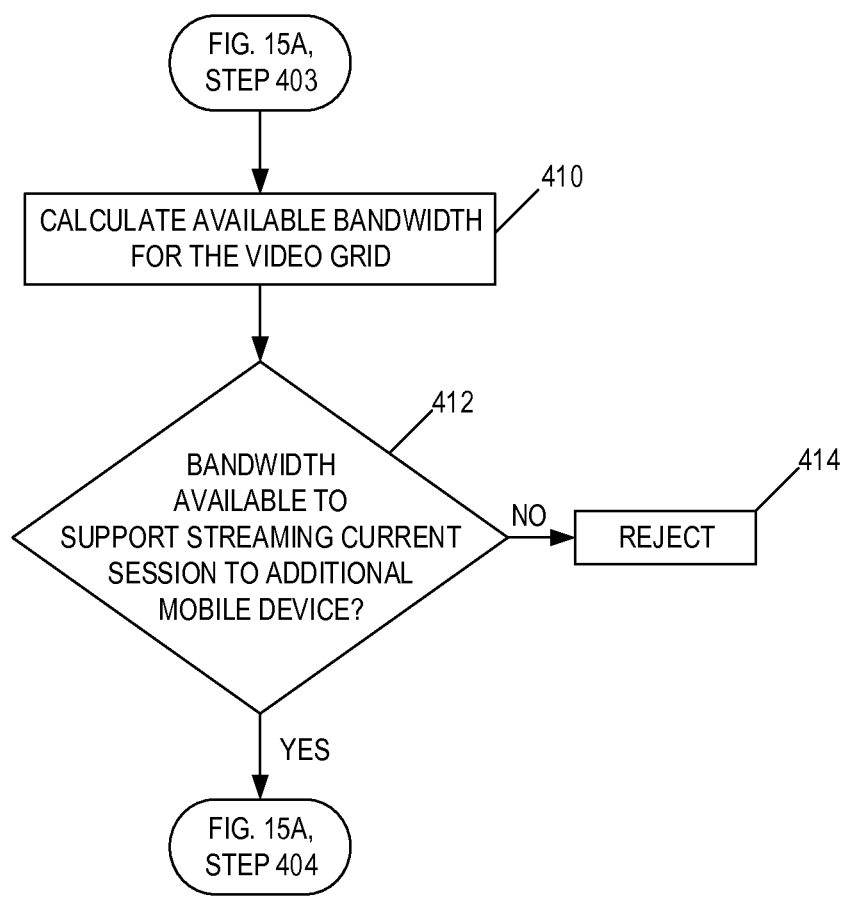

FIGS. 15A and 15B illustrate a flow chart for the operation of the location mapping to grid video content AS 26 that enables the mobile device 20 to join playout after playout on the mobile device video wall 10 has already begun according to some embodiments of the present disclosure. This process is similar to that of FIG. 9 and, as such, the same reference numbers are used where appropriate. As illustrated, the location mapping to grid video content AS 26 receives location information from the mobile device 20 (step 400). Based on the location information, the location mapping to grid video content AS 26 determines whether the mobile device 20 is located in a video grid (step 402). If not, the process returns to step 400 and is repeated upon receiving location information from a mobile device 20. If the mobile device 20 is in a video grid, the location mapping to grid video content AS 26 determines whether playout for the video grid has already begun (step 403). If not, the process proceeds as described above with respect to FIG. 9. However, if playout has already begun, in this example, the location mapping to grid video content AS 26 calculates the available bandwidth for the video grid (step 410). For example, in some embodiments, the streams of the partial-frame video content to the mobile devices 20 are unicast streams meaning that there is available bandwidth for the video grid if:

$$\text{number of clients downloading} \times \text{stream bitrate} < \text{pipe size,}$$

where the number of clients downloading is the number of mobile devices 20 that are currently downloading the partial-frame video content, stream bitrate is the bitrate needed for each download stream, and pipe size is the maximum bandwidth/bitrate supported. For example, suppose that the maximum bandwidth is 150 Megabits per second (Mbs), the partial-frame video content is encoded at 4 Mbs, and there are twenty downloads currently in progress on the same 150 Mbs link. Then, in this case, 80 Mbs of 150 Mbs maximum is being used. As such, there is 70 Mbs bandwidth available for new downloads. In another example, some overhead could be accounted for in the following manner:

$$\text{number of client downloading} \times \text{stream bitrate} \times \text{overhead} < \text{pipe size.}$$

If this condition is satisfied, then there is available bandwidth for the video grid. Otherwise, there is not. The overhead (in bits per second) could be for simple Transmission Control Protocol (TCP) traffic overhead.

If the available bandwidth is sufficient to support streaming (or delivery) of the appropriate media file(s) to an additional mobile device 20 (step 412; YES), the process proceeds to step 404 and continues as described above. However, if the available bandwidth is not sufficient to support streaming (or delivery) of the appropriate media file(s) to an additional mobile device 20 (step 412; NO), the location mapping to grid video content AS 26 rejects the mobile device 20 and the process ends (step 414).

Figure 16:
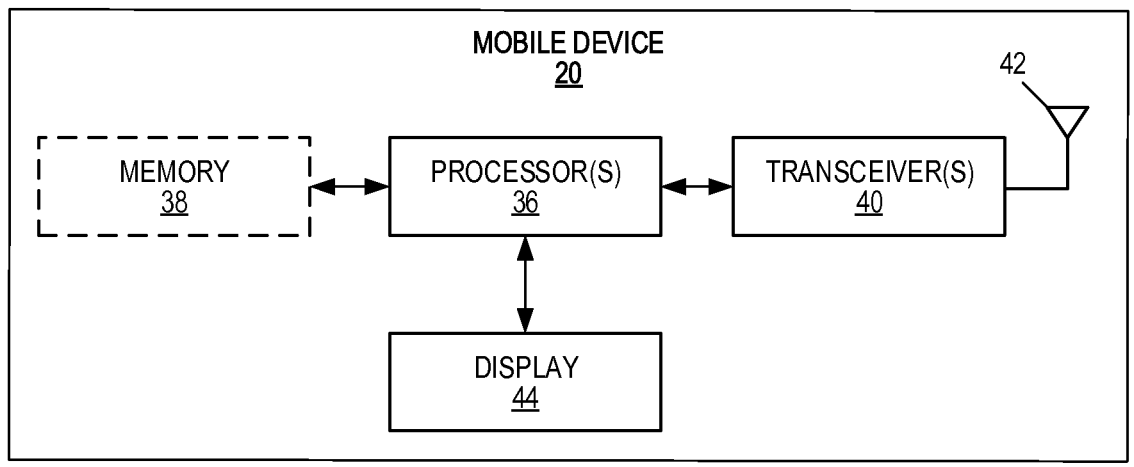
FIG. 16 is a block diagram of one of the mobile devices of FIG. 2 according to some embodiments of the present disclosure.

FIG. 16 is a block diagram of a mobile device 20 according to some embodiments of the present disclosure. As illustrated, the mobile device 20 includes one or more processors 36, or processor circuitry, (e.g., microprocessors, CPUs, Application Specific Integrated Circuits (ASICs), and/or Field Programmable Gate Arrays (FPGAs)), memory 38, one or more transceivers 40 coupled to one or more antennas 42, and a display 44. As will be appreciated by one of ordinary skill in the art, while not illustrated, the mobile device 20 may include additional components. The transceiver(s) 40 may include, e.g., a cellular network transceiver, a Wi-Fi transceiver, and/or a Bluetooth transceiver. In some embodiments, the functionality of the mobile device 20 described herein is implemented in software that is stored in, e.g., the memory 38 and executed by the processor(s) 36.

In some embodiments, a computer program including instructions which, when executed by at least one processor, causes the at least one processor to carry out the functionality of the mobile device 20 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 38).

Figure 17:
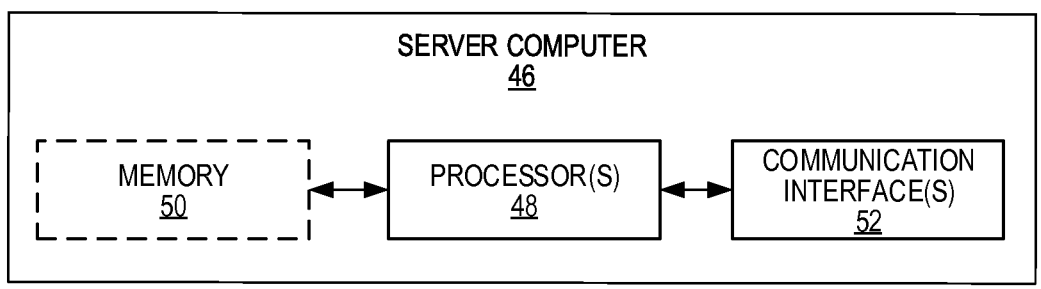
FIG. 17 is a block diagram of a server computer that implements at least some of the functionality of the mobile walled video control system of FIG. 2 according to some embodiments of the present disclosure.

FIG. 17 is a block diagram of a server computer 46 according to some embodiments of the present disclosure. The location mapping to grid video content AS 26, the location content playout controller 28, the grid media file delivery AS 30, and the master player controller 32 are, in some embodiments, implemented on one or more server computers 46. As illustrated, the server computer 46 includes one or more processors 48, or processor circuitry, (e.g., microprocessors, CPUs, ASICs, and/or FPGAs), memory 50, and one or more communication interfaces 52 (also referred to as network interfaces). As will be appreciated by one or ordinary skill in the art, while not illustrated, the server computer 46 may include additional components. In some embodiments, the functionality of the location mapping to grid video content AS 26, the location content playout controller 28, the grid media file delivery AS 30, and/or the master player controller 32 described herein is implemented in software that is stored in, e.g., the memory 50 and executed by the processor(s) 48.

In some embodiments, a computer program including instructions which, when executed by at least one processor, causes the at least one processor to carry out the functionality of the location mapping to grid video content AS 26, the location content playout controller 28, the grid media file delivery AS 30, and/or the master player controller 32 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 18:
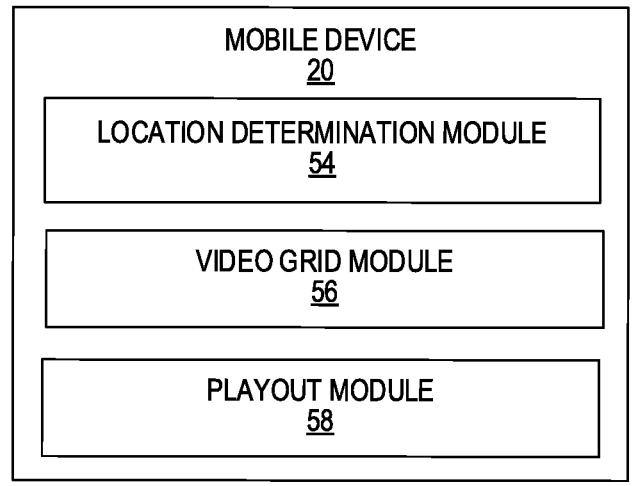
FIG. 18 is a block diagram of one of the mobile devices of FIG. 2 according to some other embodiments of the present disclosure.

FIG. 18 is a block diagram of the mobile device 20 according to some other embodiments of the present disclosure. As illustrated, the mobile device 20 includes a location determination module 54, a video grid module 56, and a playout module 58, each of which is implemented in software. The location determination module 54 determines or otherwise obtains the physical location of the mobile device 20, as described above. The video grid module 56 uses the location information to obtain the partial-frame video content for the corresponding grid location in a video grid, as described above. The playout module 58 provides playout of the partial-frame video content, as described above.

Figure 19:
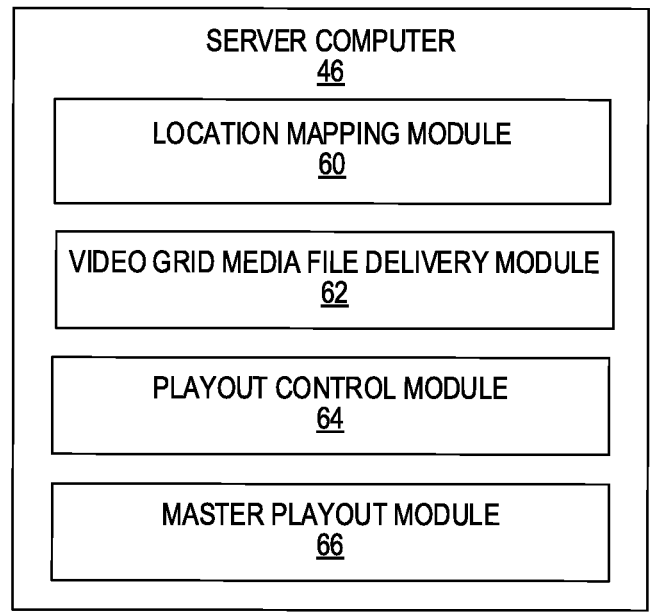
FIG. 19 is a block diagram of a server computer that implements at least some of the functionality of the mobile walled video control system of FIG. 2 according to some other embodiments of the present disclosure.

FIG. 19 is a block diagram of the server computer 46 according to some other embodiments of the present disclosure. As illustrated, the server computer 46 includes a location mapping module 60, a video grid media file delivery module 62, a playout control module 64, and a master playout module 66, each of which is implemented in software. Notably, while all of the modules 60-66 are included in this example, the sever computer 46 may include any one or more of the modules 60-66, depending on the particular implementation. The location mapping module 60 operates to provide the functionality of the location mapping to grid video content AS 26 described above, the video grid media file delivery module 62 operates to provide the functionality of the grid media file delivery AS 30 described above, the playout control module 64 operates to provide the functionality of the location content playout controller 28 described above, and the master playout module 66 operates to provide the functionality of the master player controller 32 described above.

The following acronyms are used throughout this disclosure.

AS Application Server
ASIC Application Specific Integrated Circuit
CPU Central Processing Unit
FA Frame Area
FPGA Field Programmable Gate Array
GPS Global Positioning System
HD High Definition
ID Identity
IGMP Internet Group Management Protocol
LE Low Energy
Mbs Megabits per Second
QR Quick Response
RF Radio Frequency
RTLS Real-Time Location Service
TCP Transmission Control Protocol
URL Uniform Resource Locator Those skilled in the art will recognize improvements and modifications to the embodiments of the present disclosure. All such improvements and modifications are considered within the scope of the concepts disclosed herein and the claims that follow.

What is claimed is:

1. A method of operation of a mobile device to provide playout of full-frame video content for a mobile device video wall, the method comprising:
obtaining one or more media files that contain partial-frame video content for a grid location in a video grid for the mobile device video wall, wherein:
the video grid divides each frame of the full-frame video content into a plurality of frame areas each corresponding to a different one of a plurality of grid locations in the video grid such that the partial-frame video content for the grid location consists of video content from a corresponding frame area of the plurality of frame areas of the full-frame video content;
each grid location of the video grid corresponds to a different set of one or more physical locations of mobile devices within the mobile device video wall;
the grid location for which the one or more media files are obtained is one of the plurality of grid locations that corresponds to a physical location of the mobile device; and
the partial-frame video content for the grid location comprises partial-frame video content corresponding to each of a plurality of times in the playout; and
providing playout of the partial-frame video content for the grid location such that the playout of the partial-frame video content for the grid location corresponding to the plurality of times by the mobile device is synchronized to playout of partial-frame video content for other grid locations in the video grid by other mobile devices in the mobile device video wall.

2. The method of claim 1, further comprising:
receiving a notification that indicates a time at which the playout of the partial-frame video content for the grid location is to begin,
wherein providing the playout of the partial-frame video content for the grid location comprises providing the playout of the partial-frame video content beginning at the time indicated by the notification.

3. The method of claim 2, wherein the notification is a multicast notification.

4. The method of claim 1, further comprising:
receiving a multicast notification address:port;
joining a multicast at the multicast notification address: port; and
receiving a multicast notification via the multicast on the multicast notification address:port that indicates a time at which the playout of the partial-frame video content for the grid location is to begin,
wherein providing the playout of the partial-frame video content for the grid location comprises providing the playout of the partial-frame video content beginning at the time indicated by the multicast notification.

5. The method of claim 4, further comprising:
sending location information to a remote system that is indicative of the physical location of the mobile device; and
receiving one or more uniform resource locators for the one or more media files from the remote system in response to sending the location information,
wherein obtaining the one or more media files that contain the partial-frame video content for the grid location comprises obtaining the one or more media files that contain the partial-frame video content for the grid location using the one or more uniform resource locators.

6. The method of claim 1, further comprising, after the playout of the full-frame video content by the mobile device video wall has begun:
receiving a notification that indicates a master player playout timing for the full-frame video content,
wherein providing the playout of the partial-frame video content for the grid location comprises providing the playout of the partial-frame video content according to the master player playout timing such that the playout of the partial-frame video content begins at an appropriate playout location within the partial-frame video content to synchronize playout at the mobile device with playout at the other mobile devices in the mobile device video wall.

7. The method of claim 6, wherein the notification is a multicast notification.

8. The method of claim 1, further comprising:
receiving a multicast notification address:port;
joining a multicast at the multicast notification address: port; and
receiving a multicast notification via the multicast on the multicast notification address:port that indicates a master player playout timing at which the partial-frame video content for the grid location is to begin,
wherein providing the playout of the partial-frame video content for the grid location comprises providing the playout of the partial-frame video content according to the master player playout timing such that the playout of the partial-frame video content begins at an appropriate playout location within the partial-frame video content to synchronize playout at the mobile device with playout at the other mobile devices in the mobile device video wall.

9. A mobile device enabled to operate, along with a plurality of other mobile devices, to provide playout of full-frame video content as a mobile device video wall, the mobile device comprising:
a display;
one or more processors; and
memory containing software executable by the one or more processors, whereby the mobile device is operative to:
obtain one or more media files that contain partial-frame video content for a grid location of a video grid for the mobile device video wall, wherein:
the video grid divides each frame of the full-frame video content into a plurality of frame areas each corresponding to a different one of a plurality of grid locations in the video grid such that the partial-frame video content for the grid location consists of video content from a corresponding frame area of the plurality of frame areas of the full-frame video content;
each grid location of the video grid corresponds to a different set of one or more physical locations of mobile devices within the mobile device video wall;
the grid location for which the one or more media files are obtained is one of the plurality of grid locations that corresponds to a physical location of the mobile device; and
the partial-frame video content for the grid location comprises partial-frame video content corresponding to each of a plurality of times in the playout; and
provide playout of the partial-frame video content for the grid location on the display such that the playout of the partial-frame video content for the grid location corresponding to the plurality of times by the mobile device is synchronized to playout of partial-frame video content for other grid locations in the video grid by the other mobile devices in the mobile device video wall.

10. A method of operation of a server system comprising one or more server computers to provide playout of full-frame video content by a mobile device video wall, the method comprising:
for each mobile device of a plurality of mobile devices comprised in the mobile device video wall, delivering one or more media files that contain partial-frame video content for a grid location in a video grid for the mobile device video wall, wherein:
the video grid divides each frame of the full-frame video content into a plurality of frame areas each corresponding to a different one of a plurality of grid locations in the video grid such that the partial-frame video content for the grid location consists of video content from a corresponding frame area of the plurality of frame areas of the full-frame video content;
each grid location of the video grid corresponds to a different set of one or more physical locations of mobile devices within the mobile device video wall;
the grid location for which the one or more media files are delivered to the mobile device is one of the plurality of grid locations that corresponds to a physical location of the mobile device; and the partial-frame video content for the grid location comprises partial-frame video content corresponding to each of a plurality of times in the playout; and providing, to the plurality of mobile devices comprised in the mobile device video wall, a notification that enables the plurality of mobile devices comprised in the mobile device video wall to provide synchronized playout of the partial-frame video content corresponding to the plurality of times for the corresponding grid locations of the video grid.

11. The method of claim 10, wherein the notification indicates a time at which the playout of the full-frame video content by the mobile device video wall is to begin.

12. The method of claim 11, wherein the notification is a multicast notification.

13. The method of claim 11, further comprising:
providing a multicast notification address:port to the plurality of mobile devices to thereby enable the plurality of mobile devices to join a multicast at the multicast notification address:port,
wherein providing the notification comprises transmitting the notification via the multicast on the multicast notification address:port.

14. The method of claim 13, further comprising, for each mobile device of the plurality of mobile devices comprised in the mobile device video wall:
receiving location information that is indicative of the physical location of the mobile device;
determining the grid location of the mobile device within the video grid based on the location information; and
delivering one or more uniform resource locators for the one or more media files for the grid location to the mobile device.

15. The method of claim 10, further comprising, after the playout of the full-frame video content by the mobile device video wall has begun:
multicasting notifications to the plurality of mobile devices that indicate a master player playout timing for the full-frame video content.

16. The method of claim 10, further comprising, after the playout of the full-frame video content by the mobile device video wall has begun:
receiving location information that is indicative of the physical location of a new mobile device;
determining that the new mobile device is in the video grid based on the location information;
determining that the playout for the full-frame video content by the mobile device video wall has already begun;
upon determining that the playout for the full-frame video content by the mobile device video wall has already begun, determining whether to accept the new mobile device into the mobile device video wall;
determining the grid location of the new mobile device within the video grid based on the location information; and
upon determining to accept the new mobile device into the mobile device video wall, delivering, to the new mobile device, one or more uniform resource locators for the one or more media files for the grid location of the new mobile device.

17. The method of claim 16, further comprising:
delivering a multicast notification address:port to the new mobile device to thereby enable the new mobile device to join a multicast at the multicast notification address:port,
wherein providing the notification comprises multicasting the notification on the multicast notification address:port that indicates a master player playout timing for the full-frame video content.

18. The method of claim 10, further comprising:
determining whether it is safe to begin the playout of the full-frame video content on the mobile device video wall; and
determining whether the playout of the full-frame video content on the mobile device video wall has been triggered,
wherein:
providing the notification comprising providing, to the plurality of mobile devices comprised in the mobile device video wall, a notification that indicates a time at which the playout of the full-frame video content by the mobile device video wall is to begin upon determining that it is safe to begin the playout of the full-frame video content on the mobile device video wall and determining that the playout of the full-frame video content on the mobile device video wall has been triggered.

19. The method of claim 18, wherein determining whether it is safe to begin the playout of the full-frame video content on the mobile device video wall comprises determining whether media files for at least a predefined threshold number of the plurality of grid locations in the video grid have been successfully delivered to corresponding mobile devices in the mobile device video wall.

20. The method of claim 10, further comprising:
generating the video grid; and
encoding the full-frame video content according to the video grid to provide partial-frame video content for the plurality of grid locations in the video grid.

21. The method of claim 20, wherein generating the video grid comprises dynamically generating the video grid.

22. A server system comprising:
one or more server computers operative to:
for each mobile device of a plurality of mobile devices comprised in a mobile device video wall, deliver one or more media files that contain partial-frame video content for a grid location in a video grid for the mobile device video wall, wherein:
the video grid divides each frame of full-frame video content into a plurality of frame areas each corresponding to a different one of a plurality of grid locations in the video grid such that the partial-frame video content for the grid location consists of video content from a corresponding frame area of the plurality of frame areas of the full-frame video content;
each grid location of the video grid corresponds to a different set of one or more physical locations of mobile devices within the mobile device video wall;
the grid location for which the one or more media files are delivered to the mobile device is one of the plurality of grid locations that corresponds to a physical location of the mobile device; and
the partial-frame video content for the grid location comprises partial-frame video content corresponding to each of a plurality of times in a playout; and provide, to the plurality of mobile devices comprised in the mobile device video wall, a notification that enables the plurality of mobile devices comprised in the mobile device video wall to provide synchronized playout of the partial-frame video content corresponding to the plurality of times for the corresponding grid locations of the video grid.

* * * * *